June 11, 1935.  E. HOPKINS  2,004,112
TELETICKET SYSTEM
Filed Oct. 26, 1929  8 Sheets-Sheet 1
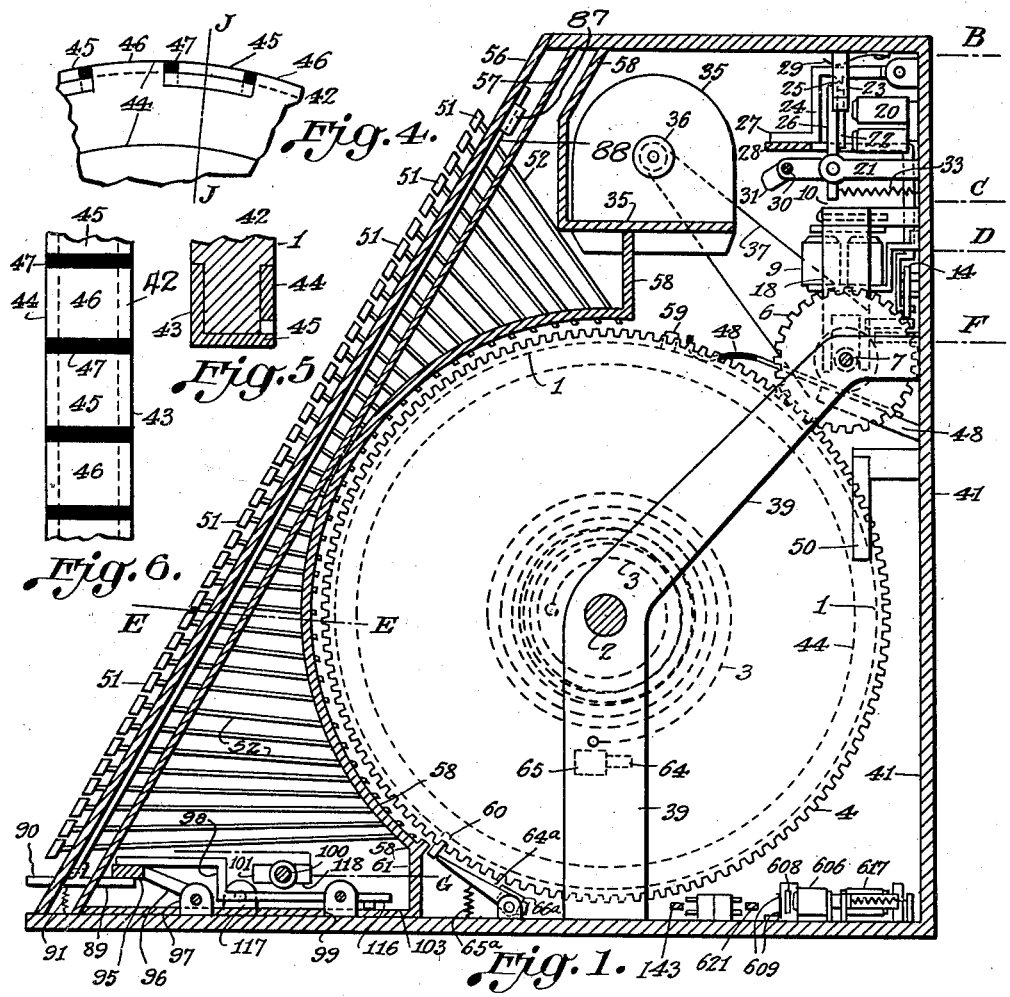
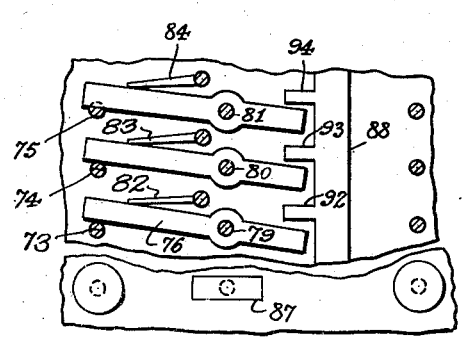
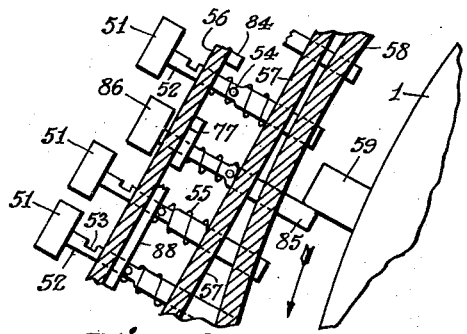
Inventor:
Edwin Hopkins June 11, 1935.  E. HOPKINS  2,004,112
TELETICKET SYSTEM
Filed Oct. 26, 1929  8 Sheets-Sheet 2

INVENTOR:
Edwin Hopkins

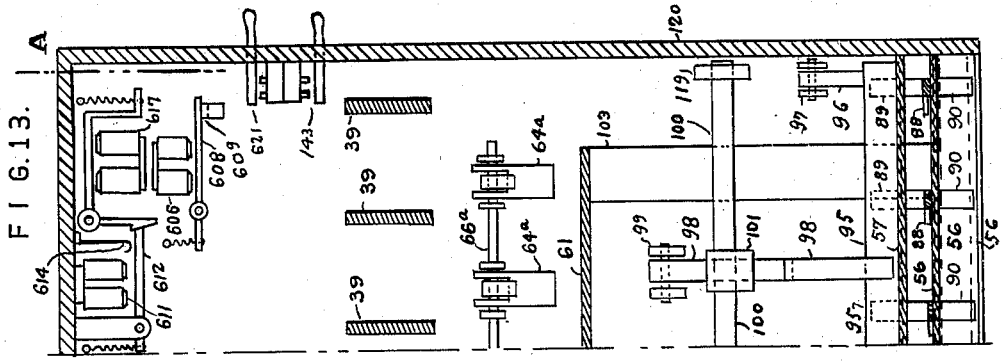

June 11, 1935.  E. HOPKINS  2,004,112
TELETICKET SYSTEM
Filed Oct. 26, 1929  8 Sheets-Sheet 4

INVENTOR:
Edwin Hopkins

June 11, 1935.  E. HOPKINS  2,004,112
TELETICKET SYSTEM
Filed Oct. 25, 1929  8 Sheets-Sheet 5

INVENTOR:
Edwin Hopkins

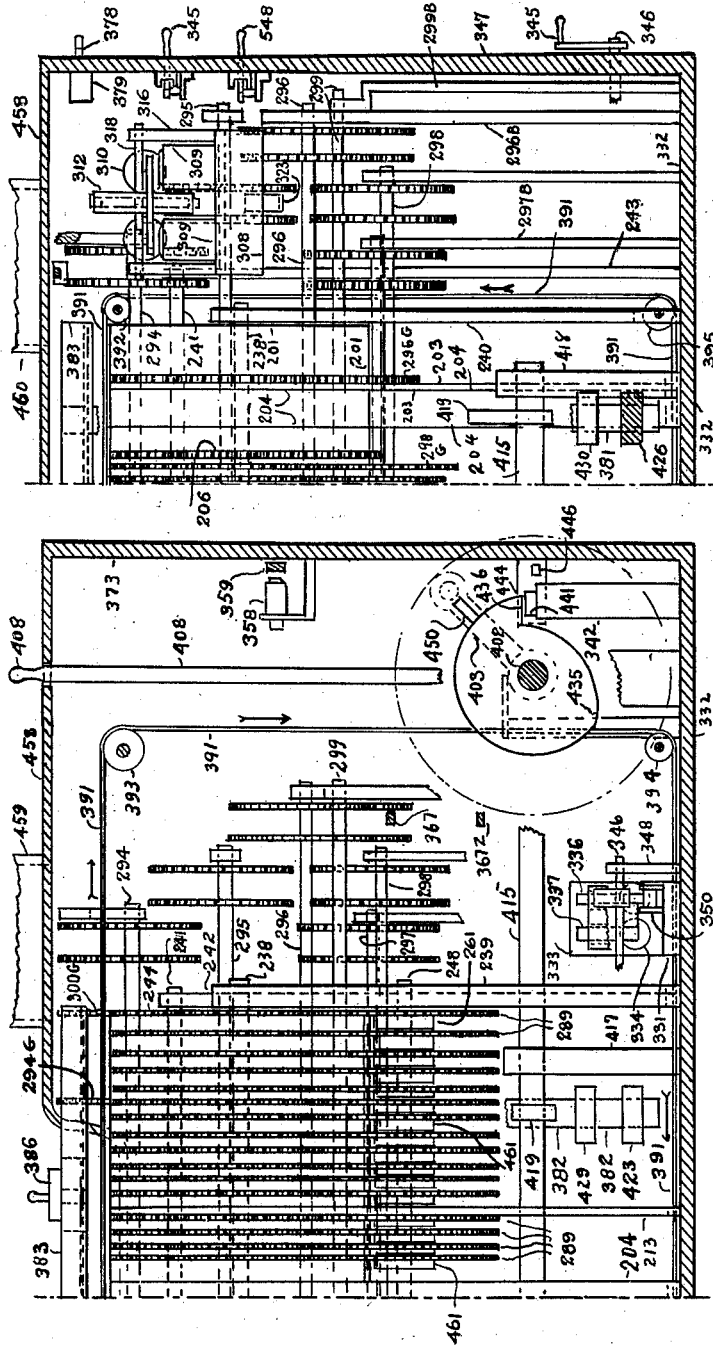
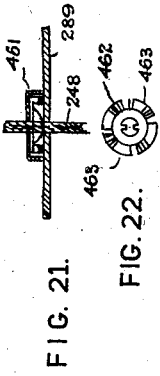
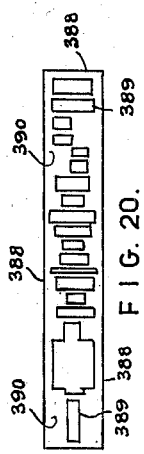

INVENTOR:
Edwin Hopkins

Patented June 11, 1935

2,004,112

UNITED STATES PATENT OFFICE 2,004,112

TELETICKET SYSTEM

Edwin Hopkins, New York, N. Y.

Application October 26, 1929, Serial No. 402,714

25 Claims. (Cl. 178—4)

The main purpose of my invention is to provide means for printing theatre tickets by telegraph at a number of stations located at various distances from the theatre. Thus stations in drug stores and elsewhere throughout a city may print tickets for any theatre in the system, the printing being under the control of the theatre to which tickets are desired.

In a system of eighty theatres fitted with sending apparatus and a thousand stores in which are located printing apparatus, any such station may telephone any theatre and when it is ascertained that the theatre has tickets acceptable to the purchaser visiting the station, the theatre sets the printing apparatus by telegraphic signals over the telephone wires and the station operator then operates the printer, the theatre operator automatically cancelling his ticket at the same time. The theatre operator's sending apparatus permits him to send signals which will only print tickets for his theatre. But he may have a printer and thus be able to secure tickets for any other theatre if desired by his patron.

It is also within my invention to keep a group of sending machines and supplies of tickets for all theatres at a central office, and outlying stations may obtain their tickets through the central station. In such case the sending apparatus is fitted with means for selling tickets for all theatres. One sender may be fitted for a small group of theatres and if a distant patron does not wish seats available for any of those, the call may be switched to another small group without compelling the patron to telephone to a number of different theatres from the printing station.

The apparatus consists chiefly of a sending apparatus adapted to be set by its keys to send a series of electrical impulses in groups of alternating impulses, prolongations of one such impulse and dead spaces, from a series of sending discs coming into action automatically in succession, and a receiving-printing apparatus with a multiple number of type wheels adapted to be set to the printing position by the several groups of impulses, automatically in succession. When the type wheels are thus set the printer station operator prints the ticket by manual operation. The printer then clears itself auomatically, but the sending operator by changing a single key may send the adjoining seat without resetting his apparatus, which he clears by manual operation when through, automatically cancelling the tickets sent.

Further features of the invention will be found set forth in detail hereinafter.

In carrying out my invention I find it generally desirable to employ the herein described apparatus and manufactures, but it is to be understood in carrying out the objects of my invention, less than all of the different means, mechanisms, and manufactures herein described may be employed for some uses, or parts only may be employed, or other mechanisms and manufactures similar may be employed and substituted, and while the preferred forms of my invention are shown, it is to be understood that many of the structural details and steps resorted to may be varied and many changes in details and steps resorted to without departing from the scope and spirit of my invention, nor do I limit myself to the specific devices, manufactures and methods shown, although I believe them especially suited to the ends to be attained by my invention.

The accompanying drawings are largely diagrammatical and are not to be considered as working drawings of the invention, but merely as illustrations of the principles of the invention. Many parts of the apparatus are omitted from the particular figures and in particular figures different planes are taken and portions forward of the planes are indicated and the juncture of the planes is not always indicated, for the purpose of clearness of illustration of the invention without the multiplication of drawings. Terms used in the singular imply the plural and vice versa when the context so indicates.

In the accompanying figures of the drawings, illustrating a form of my invention and forming a part hereof, and in which the same reference numerals and letters indicate the same or corresponding parts:

Fig. 1 to Fig. 13 inclusive, sheets one to three, illustrate the sending apparatus:

*Sheet one*

Fig. 1 is a sectional end elevation on line A of Fig. 13, looking towards the left hand end as illustrated in Fig. 11.

Fig. 2 is composed of an upper and lower part. The lower part is a plan of two keys of the keyboard and the front wall, and the upper part is a section with the face or front wall removed.

Fig. 3 is a vertical section of a portion of the keyboard on line H of Fig. 8.

Fig. 4 is a side elevation of a portion of a commutator disc.

Fig. 5 is a section of the same on line J of Fig. 4.

Fig. 6 is a plan of the periphery of same.

Sheet two

Figure 7:
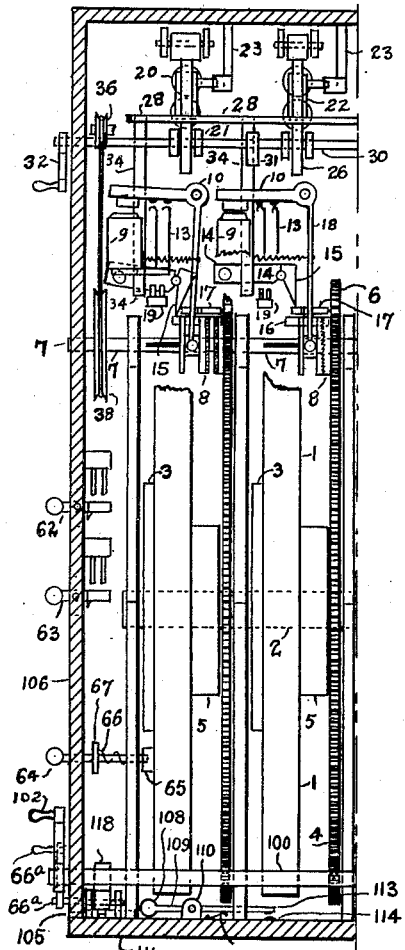

Fig. 7 is a longitudinal section from top to bottom through the left end of the apparatus with the front keyboard walls removed.

Figure 8:
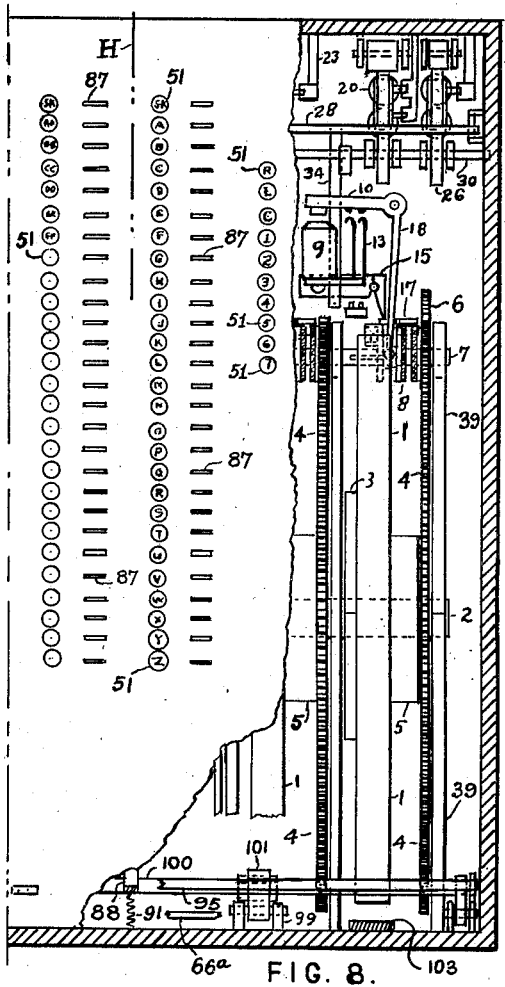

Fig. 8 is a similar section as regards the right side, while the left side, left of the broken line, is a front elevation of the middle of the apparatus.

Figure 9:
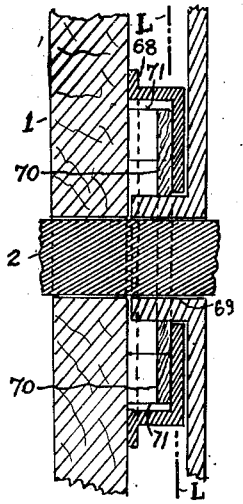
Figure 10:
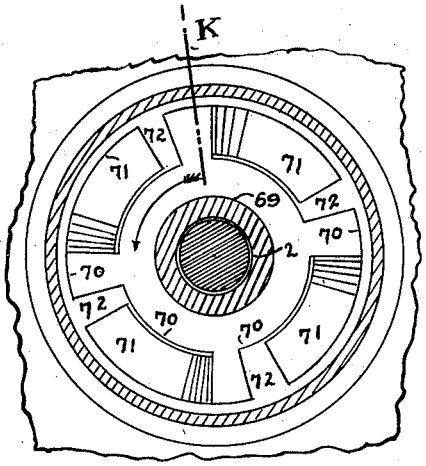

Fig. 9 is a section of the friction drum of the commutator disc, on line K of Fig. 10.

Fig. 10 is a side elevation of the same, partly in section on line L of Fig. 9.

Sheet three

Fig. 11 is a sectional plan at different elevations. The upper part, beginning at the left, is on lines B, C, D and F of Fig. 1, the front walls are shown in section on line E of Fig. 1 and the lower part is a skeletonized plan.

Fig. 12 is a plan, partly in section, to the right of the broken line. This indicates the commutator disc and brushes below line F of Fig. 1.

Fig. 13 is a sectional plan on line G of Fig. 1.

Figs. 14 to 22 inclusive illustrate the printer; sheets three to six inclusive.

Sheet four.

Figure 14:
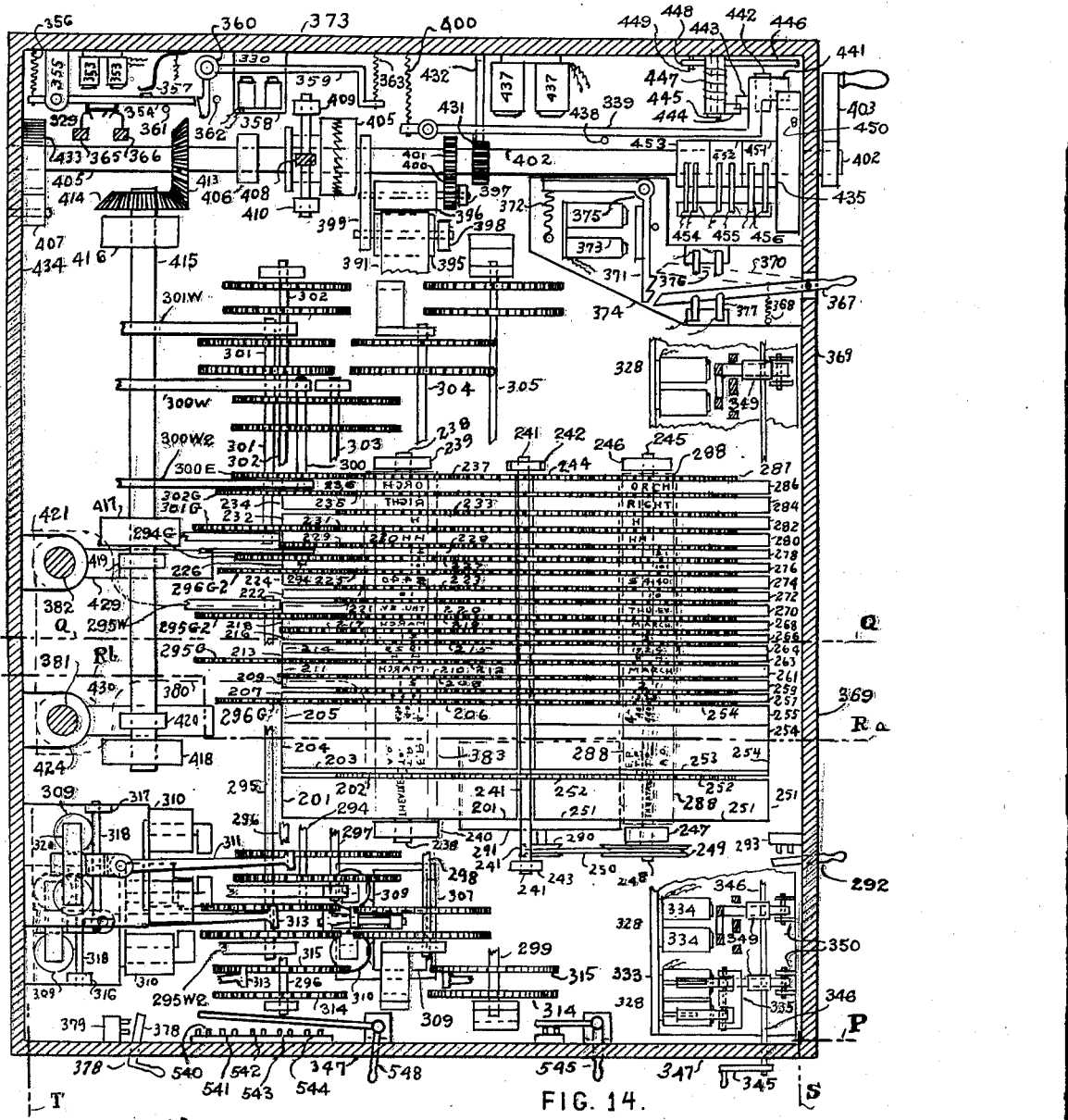
Figure 17:
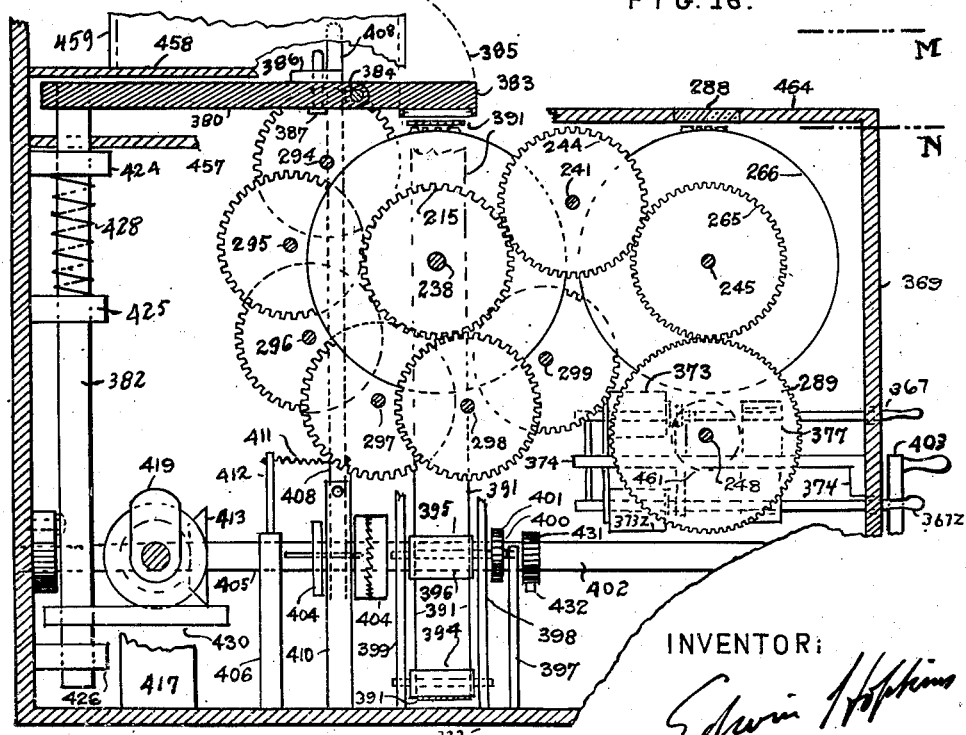

Fig. 14 is a sectional plan on lines M and N of Fig. 17.

Figure 15:
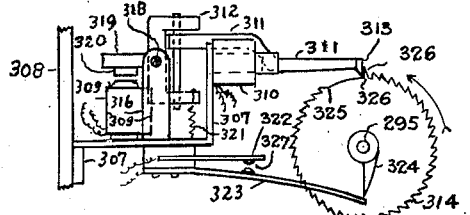

Fig. 15 is a side elevation of an escapement unit.

Sheet five

Figure 16:
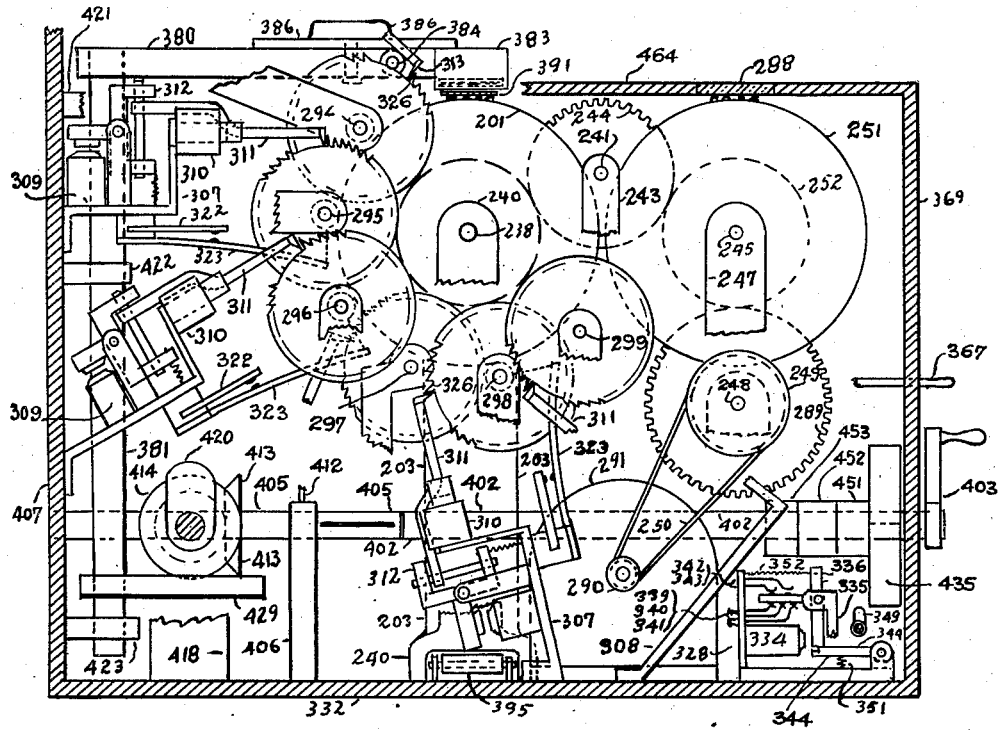

Fig. 16 is a sectional end elevation on line P of Fig. 14.

Fig. 17 is a sectional end elevation on line Q of Fig. 14.

Sheet six

Fig. 18 is a side sectional elevation of the manual printing crank end of the apparatus, taken from the end to line Ra looking at the right side of Fig. 14; on line S of Fig. 14.

Fig. 19 is a sectional side elevation of the other end of same taken from the end to line Rb of Fig. 14, on line T of Fig. 14.

Fig. 20 is a plan of a masking matrix or stencil for the printer arm.

Fig. 21 is a cross section of a friction drum used for the driving shaft.

Fig. 22 is a plan of a portion of Fig. 22.

Sheet seven

Figure 23:
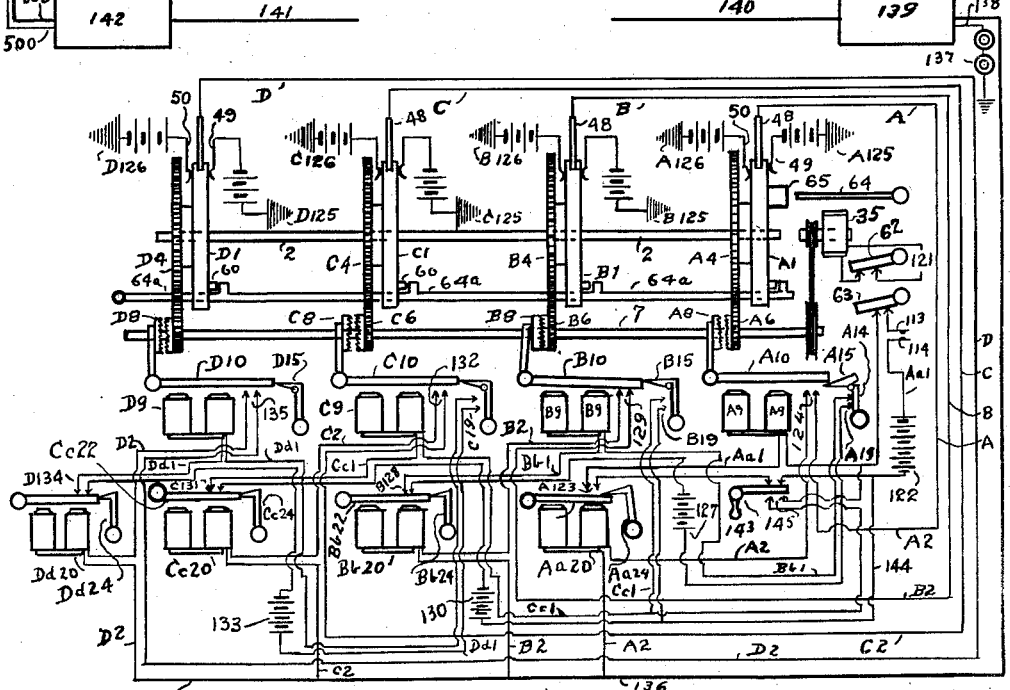

Fig. 23 is a diagram of the electrical connections of the sending apparatus.

Figure 24:
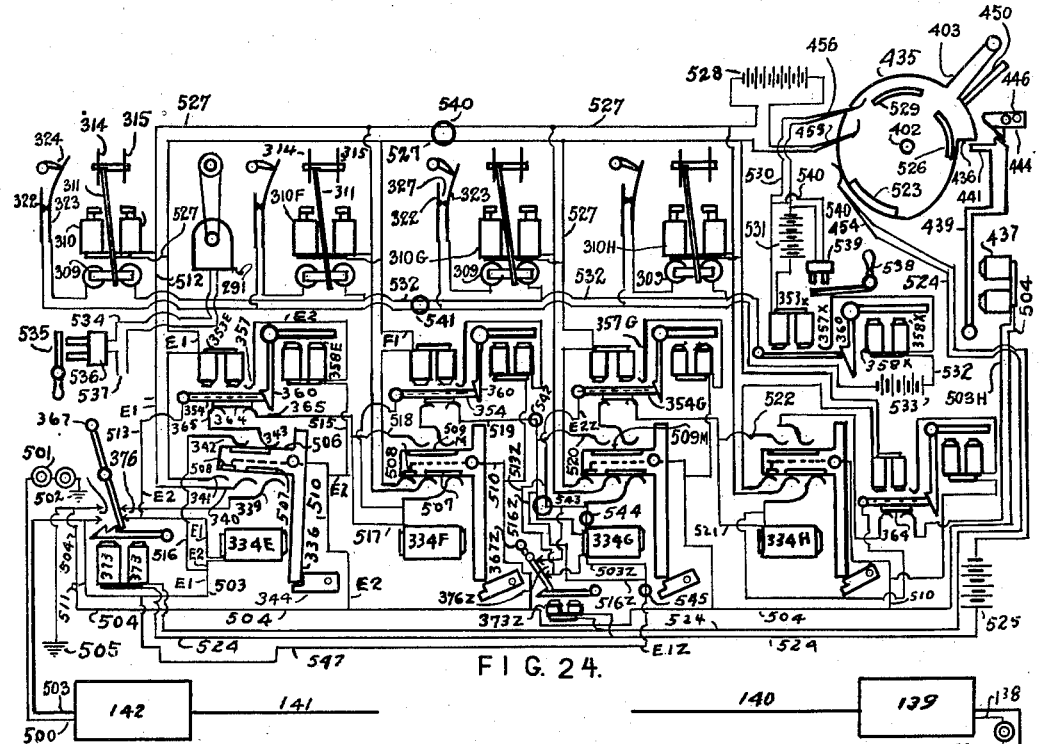

Fig. 24 is a diagram of the electrical connections of the printing apparatus.

Sheet eight

Figure 25:
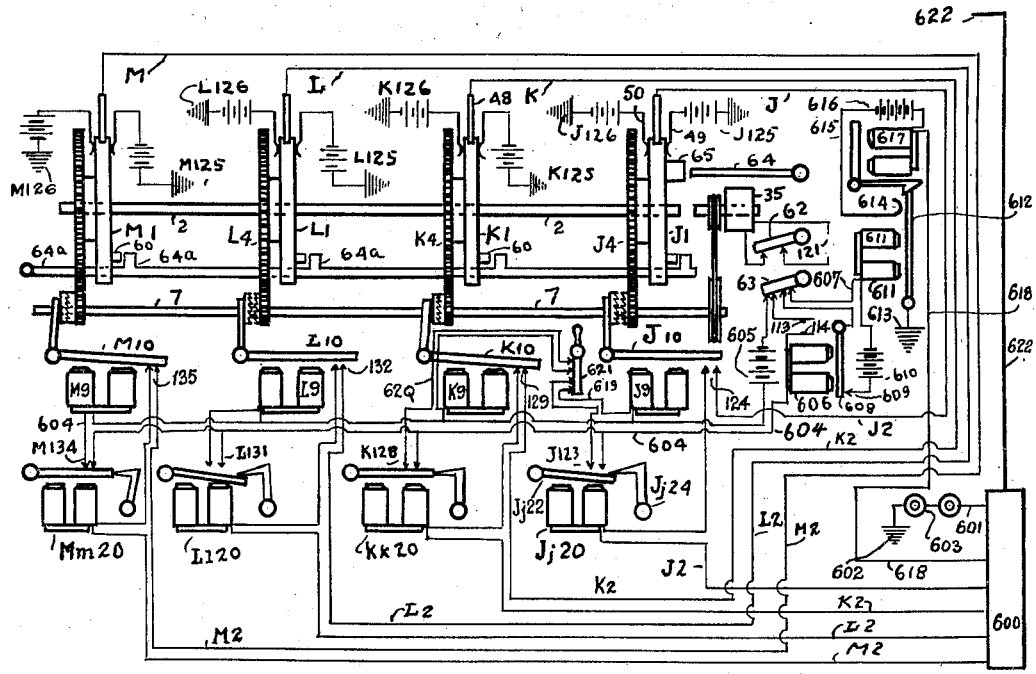

Fig. 25 is a diagram of the electrical connections of the sending apparatus when multiple high frequency currents are used.

Figure 26:
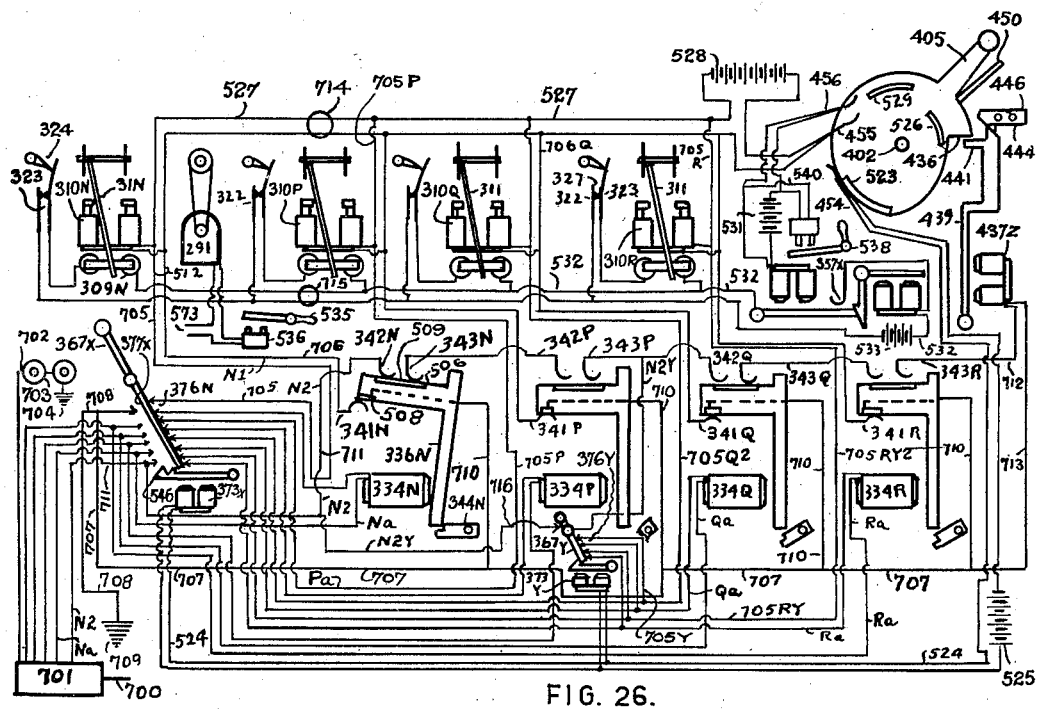

Fig. 26 is a diagram of the electrical connections of the printer when multiple high frequency currents are used.

The sending apparatus illustrated in Figs. 1 to 13 comprises twelve sending discs with commutators on their peripheries adapted to send alternating current to line. These commutator discs 1 are mounted to rotate freely on shaft 2. Attached to one side of the disc is retracting spring 3, and to the other side gear 4 through a friction drum 5, illustrated in detail in Figs. 9 and 10.

Fig. 1 is a sectional elevation on line A—A of Fig. 13. Fig. 11 is a sectional plan of the left end of the apparatus. Contact-breaking magnet 20 is shown on a plane approximately indicated by line B of Fig. 1. The clutch magnet 9 is shown on the plane indicated approximately by line C of Fig. 1, and the clutch arm and crowbeak-sector system on the plane indicated approximately by line D. The front portion is about on line E of Fig. 1.

Gear 4 is driven by spur gear 6, mounted to rotate freely on shaft 7. Slidably feathered to shaft 7 are clutches 8. These clutches drive spur gears 6 when thrown into engagment by clutch magnet 9, through bell crank lever 10.

Clutch magnets 9 are supported by an arm to rear wall 41 of framework 12. A table stud of the arm 11 supporting the clutch magnets carries contact springs 13, arranged so that the contact is made when the magnet is energized and broken when it is de-energized. Attached to bar 18 of bell crank armature lever 10 is a spring which tends to keep the clutch open, but which is overcome when the magnet is energized.

A description of the sequence of operations of these magnets, circuits, springs and mechanical parts will be given later in connection with diagram 23.

A crowbeak ratchet composed of arm 14 and beak 15 is mounted on a stud in framework 12, adapted to rotate in a vertical plane. A small spring at its axis tends to force arm 14 downward. Beak 15 is hinged to bar 14, so that its point is free to move towards the axis of bar 14, but a small spring acts in opposition to movement in that direction, the small spring being at its axis. The beak cannot move away from the axis of bar 14, by reason of shoulders at the axis of beak 15.

A table arm 16 extends from the framework towards the clutch, and carries sector 17, which is mounted on a stud in 16 to rotate partially in one direction or the other in the horizontal plane. The inner arm of lever arm 18 is bevelled to a median line, which pushes the apex of sector 17 back and forth as the clutch operates. As seen in Fig. 11, the clutch is open. Sector 17 is held in the normal median position by a small axis spring. When bar 18 moves to close the clutch 8, the apex of the sector is carried along with it until bar 18 passes it, when the sector flies back to normal. When 18 opens the clutch it carries the apex along in the other direction until it passes it and the sector flies back to its normal median position.

The point of beak 15 rests on sector 17 at times in the cycle of operations and at other times on table 16.

Figs. 7 and 8 show the three positions assumed during operation. When the apparatus is cleared to begin functioning the clutch is open, the sector is in the median position and the crow beak rests on the sector as shown in Fig. 8. As shown in Fig. 7, right hand example, the clutch is closed. This drives the fan side of the sector to the left, sliding under beak 15, but not letting beak 15 fall to the table 16. These two examples show the clutch open at the outset and the clutch closed to operate the spur gear 6, the gear 4 and the disc 1. When disc 1 is stopped by a key, clutch magnet 9 is automatically de-energized and the spring of arm 18 throws the clutch out of engagement. This causes the fan side of the sector to move to the right, which permits beak 15 to fall to table 16. As this takes place arm 14 closes switch 19, which completes a local circuit to energize the clutch magnet of the next disc unit. Beak 15 is so hinged to bar 14 that it may be forced back in the position seen in the left example of Fig. 7. In Fig. 7 the left hand example of beak and clutch have operated and the clutch has been disengaged. All the units will assume this position when the whole apparatus has functioned. The right hand example of Fig. 7 is in operation, and the example in Fig. 8 is awaiting operation. It is in the position assumed after being cleared by manual operation from the position in the left hand example of Fig. 7.

Contact breaking magnet 20 is attached to the framework by a lug, and standards 21 carry armature 22 on lever 26, making contact with pillar 23 for the line alternating circuit. The breaking of this contact breaks the line. Ratchet arm 24 is pivoted to lugs in the framework, and has a tooth, 25, which engages the end of armature lever 26. Thus when the magnet is energized bar 26 is drawn in and caught by the tooth 25 and contact at pillar 23 is permanently broken even after magnet 20 is de-energized. Foot 27 of arm 24 rests on universal lifter bar 28, extending across the whole apparatus, and it supports all the feet 27, which are depressed by springs 29. Spindle 30, rotating in the sides of the framework and in standards 21 carries cams 31 affixed to it. Manually operable crank 32 is affixed to spindle 30 and when it is rotated it lifts all the feet 27 and arms 24 and allows springs 33 to draw back the armature lever and re-make the contacts at pillars 23. This manual operation of crank 32 takes place after the mechanism has functioned in order to clear the levers for the next operation.

Universal bar lifter 28 has attached to it arms 34, which extend down and under crowbeak bar 14 and lift the crow beak levers at the same time ratchet 24 is cleared. This brings beaks 15 up to rest on sector 17, as shown in Fig. 8. This breaks contact 19 on the local clutch magnet circuit. Contact 13 is broken by the de-energization of the clutch magnets, which breaks the line circuit.

Shaft 7 on which the slidable members of the clutches are mounted is driven by a motor 35, with pulley 36, belt 37 and pulley 38 on shaft 7. Shafts 2 and 7 are fixed in standards 39 which extend from the floor 40 to rear wall 41.

Disc 1 bears a commutator 42 peripherally, with side annular rings 43, 44, connected to alternating segments as 45—46, as seen in Figs. 4, 5 and 6. Insulation 47 is placed between the segments of the commutator. Brush 48 rests on the periphery and the segments pass under it, while brushes 49, 50 contact with annular rings 43, 44, thus supplying current of opposite phase, and brush 48 thus passing alternating current to line of a frequency depending on the width of the segments and speed of disc 1.

A keyboard with keys as 51, in twelve rows, is provided. The rows are as follows:

1. Name of theatre, as Broadhurst;
2. Price of ticket as $4:40;
3. Year of sale, as 1929;
4. Day of month, as 21;
5. Month of year, as March;
6. Day of week and time of day, as Thursday Evening;
7. Number of seat in row, as 101;
8. An alternative number as 24;
9. Letter of row as HH;
10. An alternative letter as H;
11. Side of theatre, as Right;
12. Floor, as Orchestra.

The rows of keys number from left to right. The illustration shows thirty six keys in a row. This only applies to rows of seat numbers. Other rows have a fewer number or a greater number of keys as required, although where a greater number is required it is better to have alternative rows as in the case of H and HH. In Fig. 3 rows HH and H are shown, while the short row in which the keys are marked R, L, C, 1, 2, 3, 4, 5, 6 and 7 indicates locations, right, left, center and sections 1 to 7.

In rows A and AA a key will be noticed at the top marked SK. This stands for "skip", and causes the disc to stop at the first segment of the commutator and transfer the functioning to the next disk. The reason for this is that no ticket could be for more than one row, and when the ticket is printed the space of the row skipped is left blank. The number of seats in the row is also provided with a skip key. Where the number of theatres is greater than can be contained on one printing wheel, a second will be supplied with skip keys for the two rows of theatre keys.

The keys, as 51, are mounted on plungers as 52, with notch 53, peg stop 54 and spring 55, as detailed in Figs. 2 and 3. The section of the key at the end is a flat rectangle.

The keys are journalled in three walls, the front or face wall 56, the working wall 57, parallel to the face wall and the rear wall, 58, a cylindrical wall curved about the periphery of the discs for about 145°. One key of each row except the skip rows, in which case the skip key is used, is pushed in. They are automatically caught and held in.

Disc 1 carries stud 59. When disc 1 rotates counter clockwise, as seen in Fig. 1, stud 59 will presently encounter the key heel which has been pushed in. Meanwhile in rotating a number of alternating impulses are sent to line. If the top key is presented only one impulse goes to line, if the bottom key, thirty six impulses or eighteen alternations. When the disc is stopped a prolongation of the final impulse goes to line, which functions to cut out the disc and set the next disc in operation.

The prolonged impulse throws the clutch out of engagement, when spiral spring 3, which has been slightly wound up during the rotation of the disc throws the disc back to its initial position, stud 60 of disc 1 striking standard 61, which supports wall 58.

Motor 35 is started by manually closing switch 62. Switch 63 throws in the main line. When the motor is running and the line is thrown in spur gear 6 drives gear 4, but disc 1 is prevented from rotating by mechanical stop 64 engaging lug 65 on disc 1. Switch 63 closes the line indirectly through closing a local battery circuit which energizes clutch magnet 9 throwing clutch into engagement and closing main line. Stop 64 has spring 66 and flange 67. The spring draws it inward. When pulled out manually it releases disc 1. Stop 64 and lug 65 are bevelled so that when spring 3 drives disc 1 back, stop 64 again engages lug 65 automatically.

Supplementary stops for all the discs are shown at the bottom of Fig. 1. Stop arm 64a is pressed against stop 60 by spring 65a. It is pivoted in lugs on the floor and is fixed to spindle 66a, which is turned by a crank manually depressing 64a below stop 60 and allowing discs to turn.

Friction drum 5 is illustrated in detail in Figs. 9 and 10. Cup 68 is fixed to disc 1. Disc 1 rotates freely on shaft 2. Gear 4 which has a boss hub 69 rotates freely on shaft 2. Affixed to boss 69 is disc 70, which rubs the inner face of cup 68. Disc 70 has four wings as 71, cut through and bent down. The lower ends rest on the face of disc 1; the portions marked 72 in Fig. 10. The wings are of springy material and force faces 68 and 70 together. While gear 4 rotates and disc 1 is free to rotate, the pressure of wings 71 is sufficient to carry disc 1 along, but if disc 1 is stopped, wings 71 continue to rotate along with boss 69 and gear 4, and rub over the face of disc 1, starting it instantly it is released. As there is only a small load on disc 1, wings 71 need press only lightly on disc 1.

In order to hold the keys in the operative position when they are depressed and to release them singly or in totality simultaneously, means are provided as shown in detail in Figs. 2 and 3. The lower part of Fig. 2 is an elevation of the face wall 56 and two keys with a wing thumb piece. The upper part of the figure is a section with the face wall removed. Key plungers 73, 74 are in idle position. Key plunger 75 has been depressed to the operative position. Latch levers 76, 77, 78 are provided, pivoted on stud screws 79, 80, 81. Mounted on stud screws also are leaf springs 82, 83, 84 which force the latch levers against the sides of the key plungers. When the key plunger is depressed, its notch 53 is engaged by the latch lever, and its end, as 85, is held in the path of stud 59 of disc 1, and brings disc 1 to a stop when stud 59 reaches end 85. In order to return a single key, as 86, to idle position, wing thumb piece as 87 is provided. Through axis stud it is affixed to a latch lever and may be manually operated in opposition to latch lever spring to lift latch lever out of notch in plunger and allow spring 55 to return plunger to the idle position.

Sliding in guides as 87 on the inside of the face wall 56, are a set of combs as 88, terminating at the bottom each in a bar as 89, sliding in slots in walls 56, 57, the outer end of which, 90, serves as a key for the manual depression of the whole comb, in opposition to spring 91 which normally holds the combs in the upper position. The comb 88 has teeth as 92, 93, 94 which engage the ends of levers as 79, 80, 81. When lever 78 falls into notch 53, tooth 94 stops lever end 81 and the depression of key 90 will clear the key similarly as would the operation of thumb piece 87.

In order to clear all the keys at once, a universal depressing bar 95 extends across the apparatus and bears on the inner ends of bars 89. Universal bar 95 is hinged by arm 96 to a pivot in lugs 97. Depressing arms 98 lie on universal bar 95 and are pivoted in lugs 99. Three of these are sufficient, one at either end and one in the middle. Cam shaft 100 extends across the apparatus and has cams 101 and handle crank 102. When 102 is rotated manually cams 101 strike arms 98 and depress the universal bar, carrying down all the combs and freeing all the keys. Distance piece 103 extends from base 61 of wall 58 to wall 57 at the bottom. The walls are attached at the top to top plate 104 of the framework.

It is desirable to cancel at the theatre the ticket, duplicate of which is being printed in the outlying station. For this purpose slot 105 in the side wall 106 of framework 12 is provided. The ticket is thrust in endwise, guides 107 controlling its direction. It comes in contact with end 108 of lever 109 pivoted in lugs 110. End 108 is held down by spring 112. When end of ticket lifts 108 up electrical contacts at the other end, 113—114 are made, being in series with switch 63 which would not close its circuit unless 113—114 was also closed. It is thus necessary to introduce a ticket to start the apparatus.

In order to deface the ticket, punch 115 on the end of lever 116, pivoted in lugs 117, is opposite a hole in the base plate 111, and it is driven down through the ticket. Cam 118 on shaft 100 drives lever 116 down when shaft 100 is rotated manually to clear the keyboard. Shaft 100 is journalled in side 106 of framework, and in lug 119 near side 120 of framework 12.

The diagram, Fig. 23, shows the electrical connections. In the diagram the first unit at the right has been operated, the second unit is in operation and the two units to the left are awaiting operation. Only four units are indicated, but as many more as desired may be inserted, preferably between units two and three. The diagram, generally speaking, is viewing the apparatus from the rear, looking towards inside of keyboard. The operations begin on the right of the figure and work towards the left.

To operate the apparatus the following steps are taken. A ticket is inserted in slot 105, thus closing contacts 113—114. The motor 35 is turned on by switch 62. Shaft 7 now begins to rotate idly. All the clutches 8 are open. The operator closes switch 63. This completes local circuit $Aa1$. It comprises local battery or other source of direct current, 122, magnet A9 and contact 123 at armature of magnet $Aa20$. The initial position is best seen at $Bb20$, as $Aa20$ as shown has already functioned. The completion of circuit $Aa1$ energizes clutch magnet A9 and this attracts armature A10. The initial position is best seen at C10 and the completed position at B10. The drawing down of armature A10 completes main line circuit A2, but it cannot yet send impulses to line as disc A1 has not started to rotate. Contact 124 completes the line circuit. The depression of A10 causes clutch A8 to engage, as best seen at B8. Spur gear A6 rotates and drives gear A4, but as disc A1 is held by stop 64—65 it cannot rotate. Take-off brush 48 rests on insulation at the initial point.

Line circuit A2 starts at line batteries A125 and A126 with their opposite poles to earth, connected by brushes 49, 50 to commutator annular rings of disc 1, thus supplying current of opposite sign as the disc rotates. Lead A goes to contact 124 where it is completed by armature A10. It then goes to magnet $Aa20$ and from thence to line.

At this point the apparatus is in readiness for operation, the line being earthed at the outlying station. The functioning begins when stop 64 is manually released. Disc A1 begins to rotate and sends alternating impulses to line which operate the outlying printer's initial typewheel. When disc 1 is stopped by stud 59 striking a key heel set for that purpose, a prolongation of the last impulse is sent to line.

Magnet $Aa20$ is so wound that the alternating impulses do not affect it, but when the impulse is prolonged the magnet functions, and draws down its armature $Aa20$. This armature is caught by ratchet $Aa24$, and remains in that position until cleared manually at the close of the operation, by crank 32. The depression of armature $Aa22$ breaks contact 123 and opens circuit $Aa1$ permanently. This de-energizes magnet A9, which permits clutch A8 to be disengaged and breaks contact 124. Thus the line goes dead by automatic action on the functioning of the prolonged impulse. Clutch A8 being disengaged, spring 3 returns disc A1 to its initial position. The commutator of the periphery cannot send any impulses to line on the retraction of disc 1 as the line is broken at 124. There is accordingly a dead space on the line momentarily.

When armature A10 is released it allows arm 18 of bell crank 10 to pass to the left as seen in Fig. 11. This causes the fan part of sector 17 to be pushed to the right, and allows crow beak 15 to fall to table 16, and thus close contact 19. The sector is not illustrated in the diagram, but crowbeak 15 and arm 14 are indicated in the lowered position making contact A19.

The closing of A19 completes local circuit Bb1, which passes through direct current battery 127, contact B128 and clutch magnet B9. It energizes B9 and causes contact 129 to be made, setting up the main line circuit B2, which derives current from batteries B125, B126. This circuit passes on through brush B48, lead B to contact 129, magnet Bb20 and thence to line. The line remains dead as disc B1 does not rotate until clutch B8 engages, which is momentarily after the making of contact 129. Upon disc B1 rotating, alternating impulses pass to line until the disc is stopped by a key heel, when a prolonged impulse results. In the illustration of the Figure 23 the unit B is in operation and unit A has ceased to function. When the discs are stopped by the key heels the friction drum 5 between disc 1 and gear 4 permits shaft 7 and spur gear 6 to continue to rotate gear 4 while disc 1 is held at rest.

When disc B1 is stopped by a key heel, a prolonged impulse goes to line, which energizes magnet Bb20, and attracts armature Bb22, breaking contact B128, while Bb22 is locked up by ratchet Bb24. This breaks circuit Bb1 which de-energizes magnet B9, and frees B10, which then takes the position shown in the diagram by A10, breaks contact 129, which makes the line dead, and disengages clutch B8. The fall of crow beak B15 makes the contact B19 and sets up the local circuit Cc1.

Local circuit Cc1 includes contact B19, local direct current battery C130, magnet C9 and contact C131. It energizes C9 and completes line circuit C2 through contact 132. Brush C48 draws alternating impulses from batteries C125, C126 which proceed through lead C, contact 132 and magnet Cc20, and thence to line. The subsequent closing of clutch C8 starts disc C1 which sends the alternating impulses. When a key heel stops disc C1, the prolonged impulse energizes magnet Cc20, breaks contact C131, armature Cc22 being locked up by catch Cc24. When local circuit Cc1 is broken by C131, magnet C9 de-energizes, line circuit C2 is broken at 132 and local circuit Dd1 is made by the fall of crow beak C15 making contact C19. Clutch C8 is disengaged.

Local circuit Dd1 includes contact C19, direct current battery 133, magnet D9 and contact D134. This energizes magnet D9 and sets up main line circuit D2 by making contact 135. Circuit D2 starts at batteries D125, D126, thence through brushes of disc D1 to lead D, contact 135, magnet Dd20 and thence to line. The closing of clutch D8 starts disc D1 and sends alternating impulses to line. The prolongation of the last impulse energizes magnet Dd20. Contact D134 is broken, and armature Dd22 is locked up by catch Dd24. This de-energizes magnet D9, breaks contact 135 and makes line D2 dead. This completes the cycle of functions, as crow beak D15 has no function to perform in energizing a further local circuit.

The operator now prepares the apparatus for a new cycle by opening switches 62 and 63. Crank 32 is turned which clears the ratchets of the line magnets and prepares contacts for the local circuits, returning the parts to the positions indicated at C9, C10 and Bb20.

The operator then rotates crank 102 which clears the keys and defaces the ticket at 105, which is then withdrawn.

In case a ticket such as HH24 has been printed and the next ticket is to be the adjoining one at HH26, the operator does not clear the keys with crank 102, but clears key 24 with thumb piece 87 and sets key 26. He leaves ticket HH24 in slot 105 and causes the machine to operate as before. At the conclusion he defaces ticket HH24, removes it and inserts ticket HH26 and defaces it by a turn of crank 102, which only moves combs 88 idly as they have already released the keys.

The line 136 is superimposed on telephone line 138 by apparatus 139, well known in the art. Telephone 137 enables the operator to converse with the printer operator to ascertain what tickets are wanted, and to have the printer setting read back to him before printing to avoid any mistakes.

The apparatus thus functions to send selected groups of signals to line, each group comprising a selected number of alternating impulses and a prolonged impulse at the end and a dead space. These impulses and spaces are used to operate the printer at the outlying station.

The printer is illustrated in Figs. 14 to 22 inclusive.

The printing machine consists of a series of type-wheels with type on their peripheries corresponding to the keys of the sending machine, and means for setting such typewheels successively, and then for printing the ticket by manual operation.

The typewheels are caused to rotate by gears, driven by a motor through intermediate gears as later described. Typewheel 201 contains the names of the various theatres arranged parallel to the axis. To it is affixed gear 202 of considerably smaller diameter. Next comes a partition, supported by the base, but bearing a fixed type, 11, which indicates the number of the outlying station. As once a printer is installed it remains in its station, this number does not need to be succeeded by any other. It appears on all tickets. Other stations, of course have different numbers on this partition. Another partition, 204, is marked with the initials E. P., T. P., To., and A. O. This stands for the words Established Price, Tax Paid, Total Price, and Admit One. This reading matter is the same for all tickets, and this portion is, accordingly, permanently fixed.

Typewheel 205 is marked 4—, .40 and 4.40. These figures stand for $4.40, $0.40 and $4.40, coming opposite the words Established Price, Tax Paid and Total Price of the partition 204, respectively. Where the price is $3.00 or less and no tax is paid, the figures opposite Tax Paid are omitted. Attached to typewheel 205 is gear 206.

Typewheel 207 bears the year date, as 1929. To this is attached gear 208. The year day is used because of changes at the end of the year, and because a dozen years or more may be placed on it to avoid frequent changes of this wheel.

Typewheel 209 bears days of the month from 1 to 31. Attached to it is gear 210. These wheels and the following have their letters at right angles to the axis.

Typewheel 211 bears the names of the months of the year. Attached to it is gear 212.

Partition 213 is permanently supported by the base. The letters H H on it stand for the name of the apparatus and appear on every ticket. The remaining portion of the ticket from this point on is the coupon to be torn off at the theatre door and retained by the patron. It bears duplicates of price and dates, and has additional data.

The typewheels bearing duplicate matter are driven by the same shaft that drives the original, and thus do not require additional sets of keys on the sender.

Typewheel 214 again bears the year date, 1929. To it is attached gear 215.

Typewheel 216 bears the day of the month again, and attached to it is gear 217.

Typewheel 218 bears the month again, and attached to it is gear 219.

Typewheel 220 contains the days of the week, not used before, and also distinguishes between matinees and evenings. Attached to it is gear 221.

Typewheel 222 bears the figures 10. This is a number corresponding to the name of the theatre as on typewheel 201. Thus the identification of the theatre is made on the coupon after it is detached, data which needs to be familiar only to the employes of the theatre. Gear 223 is attached to typewheel 222.

Typewheel 224 bears the prices, as $4.40, indicating the total price. It is operated in conjunction with typewheel 205. Gear 225 is attached to typewheel 224.

Typewheel 226 bears the number 101, indicating a seat number. On this wheel are numbers from 101 to 135, usually center section numbers in a theatre. Attached to 226 is gear 227.

Typewheel 228 bears figure 21. This is also one of a set of seat numbers, ranging from 1 to 35, usually side section numbers. In printing a ticket either typewheel 226 or 228 is used but not both, the unused one being skipped by the skip key. Gear 229 is attached to typewheel 228.

Typewheel 230 carries letters, H. H. This is a row designation which runs from AA to ZZ. Gear 231 is attached to typewheel 230.

Typewheel 232 shows letter H. This is a row designation which runs from A to Z. In use either 230 or 232 is used but not both. The one not used is skipped. For these skipped wheels, the periphery at the initial point bears no type, and leaves a blank space on the ticket.

Gear 233 is attached to typewheel 232.

Typewheel 234 shows word Right. This is a location by sections or aisles. Gear 235 is attached to typewheel 234.

Typewheel 236 bears the designation Orch, being a floor designation, as orchestra, balcony, etc., attached in gear 237.

The gear and typewheel units are mounted to rotate freely on fixed shaft 238, set in standards 239, 240 in the base.

Mounted to rotate freely on shaft 241, fixed in standards 242—243 are seventeen gears as 244, to engage gears 202, 206, 208, 210, 212, 215, 217, 219, 221, 223, 225, 227, 229, 231, 233, 235 and 237.

These gears all engage gears 244 which in turn are engaged by gears of equal number mounted to rotate freely on fixed shaft 245, mounted in standards 246—247, which standards also serve to journal rotating shaft 248, with grooved pulley wheel 249 and pulley cord 250.

Script wheels, partitions and gears 251 to 287 inclusive correspond to type wheels, partitions and gears 201 to 237 inclusive. The script wheels and partitions are similar in size to the type wheels and partitions, and bear in readable script the same symbols as are borne by the type wheels and their partitions reversed to print from. The symbols on the script wheels and their partitions are visible through a window in the top of the cover, indicated by dotted lines 288 in Fig. 14, being above the plane of the paper of this sectional plan.

The gears affixed to the script wheels, the intermediate gears 244, and the gears affixed to the type wheels are all of the same size. Thus through window 288 may be read the data which will be on the ticket when printed. If any mistake is made by the operator of the sending machine, it becomes obvious to the operator of the printer before printing, and the printer may be cleared and the error corrected before printing.

Beneath the script wheels are seventeen gears, as 289, somewhat larger than the script wheel gears, but not necessarily so. They are attached to the shaft by friction drums 461 as seen in Figs. 21 and 22 in detail.

Shaft 248 is driven by pulley 249, cord 250 and pulley 290 on shaft of motor 291. Motor 291 runs continuously during operation. It is turned on by switch handle 292 closing switch contacts at 293 when the machine is to be operated, and is turned off manually afterwards.

Gears 289 would rotate script and typewheels continuously if not prevented, but when a typewheel and script wheel are stopped, shaft 248 continues to rotate, and will drive any of the wheels immediately they are released, through the friction drums 461.

In order to stop the typewheels at the proper locations so that the selected ticket may be reproduced, a set of twelve escapement units are provided, six on one side and six on the other.

A detailed side elevation of the escapement unit is shown in Fig. 15. There are twelve units one for each row of sender keys. Some of them control two typewheels that are duplicates, as the date and price on ticket and coupon. Twelve shafts are controlled by the escapement units, six at one end and six at the other, in six lines, two units being at the outer ends of a pair of shafts in line.

Escapement shafts 294, 295, 296, 297, 298 and 299 at the front or lower end of Fig. 14 are respectively in line with shafts 300, 301, 302, 303, 304 and 305 at the rear end.

The escapement shafts 294 to 305 inclusive have gears affixed to them, driven by the gears of the typewheels and of the same size. When the escapement shafts are stopped the typewheels and script wheels are also stopped.

Shaft 294 has gear 294G, which controls typewheel 226, bearing seat numbers, as 101. This is effected through gear 227 which engages gear 294G.

Shaft 300 is in line with shaft 294, and has gear 300G, controlling typewheel 236, indicating floors, as Orch. This control is effected through gear 237 on typewheel 236. Shaft 300 is journalled in standards 300W and 300W2, which are attached to the side wall but are broken off in the drawing, as they attach above the plane of the paper. Shaft 294 is similarly journalled but standard 294W is omitted from the drawings.

Escapement shaft 295 carries gears 295G and 295G2. Gear 295G controls typewheel 211 (March) through gear 212 on the main part of the ticket and gear 295G2 controls typewheel 218 (March) through gear 219, on the coupon part of the ticket.

Shaft 301 is in line with shaft 295. Shaft 301 carries gear 301G which controls typewheel 230 (HH) through gear 231. Shaft 301 is journalled in standards 301W and 301W2, which go to the side wall. Shaft 295 is similarly journalled.

Shaft 296 has gears 296G and 296G2. Gear 296G controls typewheel 205 ($4.40) through gear 206 on the main or admission portion of the ticket, while 296G2 controls typewheel 224, ($4.40) through gear 225 on the coupon part of the ticket.

Shaft 302 is in line with shaft 296. It has gear 302G which controls typewheel 234 (right) through gear 235. Shaft 302 is journalled in standards 302B and 302B2, the latter not shown, which extend to the floor. Shaft 296 is similarly journalled.

All the remaining escapement shafts are journalled in standards which extend to the base or floor of the machine, and which are bent and offset to reach the floor without interfering with other members. These standards are mostly broken away in the drawings for the sake of clearness.

Shaft 297 controls two typewheels bearing the day of the month, and shaft 303 in line with it controls seat number typewheel 224 (seat number 21).

Shaft 298 controls two typewheels bearing the year, (1929) and shaft 306 in line with it controls typewheel 220, (Thursday evening).

Shaft 299 controls typewheel 201 (theatre) and typewheel 226 (10, number of theatre), and shaft 305, in line with it, controls typewheel 232 (row letter H).

These seventeen forms of changeable data are thus controlled by twelve escapement units and shafts.

The escapement units are similar although placed at different angular attitudes as regards shaft 238.

As seen in Fig. 15, framework of unit 307 is attached to standard 308 which may be affixed to wall or base.

Frame 307 carries magnet 309, positioned perpendicularly and magnet 310, positioned horizontally. Escapement arm 311 is pivoted in frame 312, and has cross bar stop end 313.

A pair of escapement wheels are provided, affixed to escapement shaft as 295. They are provided with teeth. The teeth of one wheel are staggered with respect to the other by the amplitude of half the pitch of a tooth. When the arm 311 moves back and forth from one to the other, the teeth being driven towards the bar stop end 313, the shaft rotates by an angle equal to half the pitch of a tooth at each movement, or a whole tooth on a stroke back and forth. Magnet 310 is a polarized magnet and so arranged that when the arm 311 is drawn to one side it remains there until drawn to the other side by alternations of current received from line.

Thus the alternating impulses from the sender allow the escapement shafts to advance the printing wheels to the selected printing point.

On the prolonged impulse the arm 311 remains where it was drawn. When the time for clearing the escapement wheels comes, local current is applied to magnet 309, being direct current. Magnet 309 being energized, stop 313 is lifted with arm 311 from whatever tooth it happens to be in, and the escapement shaft rotates, in a counterclockwise direction as seen in Fig. 15. Arm 311 is pivoted in frame 312 which in turn is pivoted in standards 316—317 on spindle 318, while end 319 of arm 311 carries armature 320. Magnet 309 attracts this and thus lifts arm 311. Magnet 309 overcomes spring 321 which ordinarily holds arm 311 on the escapement wheels.

In order to stop all the escapement wheels at the initial point, irrespective of how many teeth have escaped, a contact breaker composed of spring leaves 322—323 is provided. The circuit of magnet 309 is in series through this breaker.

Cam 324 is fixed to the shaft 295. As it rotates after the shaft is freed by the lifting of lever arm 311, it presses down contact leaf spring 323. A space free of teeth is provided on the escapement wheels, beginning at point 325 and extending to high tooth 326. On the type and script wheels a similar blank space is provided, no letters appearing on that space.

Leaf spring 323 and spring 322 and cam 324 are so adjusted that contact at point 327 is broken just after point 325 on wheel 314 has passed stop 313. The de-energization of magnet 309 thereupon, allows spring 321 to retract arm 311 and stop 313 strikes the toothless portion between 325 and 326. When high tooth 326 strikes stop 313 the shaft stops. Similarly all the shafts are thus stopped at the initial point of the high tooth. The high tooth is provided in case arm 311 does not descend quickly enough. The wheel 314 must then stop at the initial tooth whether the magnet has released arm 311 in time or not. Cam 324 serves an additional purpose in that it dampens the momentum of the shaft towards the end of the rotation, so that the shaft is rotating much more slowly when point 325 is reached than it was earlier. Cam 324 slips off the end of leaf spring 323 at the moment arm 311 and stop 313 strike high tooth 326. Thus it is in working position even on the first impulse of the alternating current. The breaking of contacts 327 breaks other contacts automatically so that the remaking of 327 does not at that time cause 309 to be energized again. The alternating impulses from the sender having caused the first escapement unit to function are automatically switched on to the next unit so that the series of typewheels are positioned one after the other. The symbols are read through window 288, and if correct the ticket is then printed.

To accomplish the automatic succession of one escapement unit after the other, a series of twelve contact make and break magnets are provided, as 328. Also a set of twelve units of ratchet magnets, 329—330 and a thirteenth unit of the same.

Magnet 328, a plan of which is seen in Fig. 14, a side elevation in Fig. 16 and an end elevation in Fig. 18, is comprised of base plate 331 affixed to floor 332 of the machine. Riser 333 supports magnet 334, and pillar 335 serves as a pivot for a double pendant arm, 336—337 working as a unit. One arm makes contacts 339, 340, 341 and the other the two contacts 342, 343 when the armature is drawn in, breaking the contacts 339, 340, 341. When the magnet is energized the catch 344 locks the armature in that position, until it is cleared later by manual operation.

This is accomplished by means of crank 345, affixed to shaft 346 journalled in side 347 of the main frame and standard 348 at the other end mounted on base 332. Fixed on shaft 346 are cams 349, one for each catch 344. When the crank is rotated these cams depress catches 344, which are pivoted in lugs 350, and press them down against the force of spring 351. This frees the bottom end of 336 and it is drawn back to its initial position by spring 352, breaking contacts 342—343 and remaking contacts 339, 340, 341. This resetting or clearing takes place after the function is complete in order to clear the machine for a new operation.

Operated in conjunction with units 328 are units 329—330, the electrical connections of which will be described later. When magnet 353 of unit 329 is energized it attracts armature lever 354, mounted on lugs 355 set in side wall 373, and restrained by spring 356, which is overcome by the magnet's action. When the armature is attracted an electrical contact is made from the armature through leaf contact 357. This energizes magnet 358 of unit 330, which has as an armature a bell crank lever 359, pivoted at 360. Pegs 361, 362 limit the movement of armatures 354, 359.

When contact 357 is made, magnet 358 attracts the armature, overcoming spring 363. This throws catch 364 against the end of armature 354, which remains locked up, even after 353 is de-energized, until the circuit of magnet 358 is broken at another point, which unlocks armature 354 and breaks contact 357.

A contact block 364 on armature 354, but electrically isolated from it, serves to close an electric circuit through leaf springs 365, 366 when the magnet of armature 354 is de-energized. The contact is ordinarily made as armature 354 normally rests against peg 361.

There are thirteen of these units 329—330 in the apparatus, twelve in connection with the automatic transferring of alternating current from one escapement unit to the next, and one used in connection with escapement arm clearance.

The apparatus is started by turning on the motor by motor switch 292, the units 328 having first been cleared by the manual operation of crank 345. When the motor is started the friction drums 461 tend to rotate the script wheels and type-wheels, the high tooth 326, however, prevents. The sending operator is in telephonic communication with the printer operator and when the sending operator announces that his machine is set and ready to transmit, the printer operator closes line switch lever 367 against spring 368, lever 367 being pivoted in side wall 369. In the normal or open position of the switch lever it connects line to earth. When the switch 367 is closed, this contact is momentarily broken, the line is connected to the apparatus and earth is reached after passing through the apparatus.

When lever 367 is in the dotted line position 370 seen in Fig. 14 it connects line to apparatus. When closed, lever 367 is locked by bell crank lever catch 371 in opposition to spring 372, and cannot be manually released. When magnet 373 is energized by a local circuit, which happens only after the whole apparatus is set for printing, the lever 367 is released. When necessary in case of an emergency, lever 367 may be tilted out of the plane of the paper and may thus be freed from 371. If this occurs during operation it leaves some of the magnets locked up. They may be cleared as described later.

The thirteenth set 329—330 does not employ the contacts 364, 365, 366. The thirteen sets are arranged on the wall 373, but if desired may be placed under the gears 244. Platform 374 is attached to wall 369 and carries contacts 375, cutting the machine out of line, contacts 376 cutting it in line, and magnet 373, pivot 377 and bell crank 371.

An emergency switch 378 closes contact 379 to clear the escapement arms 311, as described later.

When all the type wheels have been set the printing function is carried out. A printing arm 380 is seen in side elevation in Fig. 16, section in Fig. 17, partly in front elevation in Fig. 18, and indicated in plan by dotted lines in Fig. 14., being above the plane of the paper. This arm is affixed to two plunger rods 381, 382. The printing arm is of H shape, one staff of the H, 383, extending over the type, and the cross bar of the H reaching to the portion connected with the plunger rods. Bar 383 is hinged at 384 so that it can swing up on arc indicated by dotted line 385, Fig. 17. A thumb plate 386, rotating on an axis pin 387 when turned parallel to bar 383 permits the latter to be raised. The ticket may then be inserted in grooves in the bar 383 to be printed. When the thumb plate is turned parallel to the cross bar of the H it holds the bar 383 solidly in the printing position.

Two grooves are shown in bar 383; one is for the ticket and the other for a duplicate which may be printed by the insertion of a piece of carbon paper between the two.

A masking plate, stencil or matrix 388, Fig. 20, is fitted over the ticket, the type appearing in the apertures as 389. The under side of bar 383 may also be routed out in the portions corresponding to those of the masking plate between the apertures and the edges, as 390. Thus no pressure is applied to any but the printing surfaces, and the rest of the ticket is not smudged.

When the printing lever is pressed down the printing is effected by an inked ribbon 391, similar to a typewriter ribbon, which is drawn across the type slightly between printings. The ribbon is in the form of an endless belt. Its upper stretch across the type is carried by rollers 392, 393. It passes down from 393 to roller 394, being drawn down by pressure rollers 395, 396, mounted on standards 397, 398, 399 set in the base. Roller 396 is fitted with gear 400, which is engaged by gear 401 on shaft 402. Gear 401 is stripped of teeth for half its periphery, so that the ribbon does not move during the printing stroke but moves at its conclusion, through the latter half of the rotation of shaft 402. From rollers 395—396 the ribbon proceeds under roller 394, then along the base through passage holes in the partitions and standards again to roller 395 and then up to the starting point 392.

The printing impression is effected by rotating crank 403, affixed to shaft 402 for one revolution. Shaft 402 is journalled in wall 369 and standard 399. One side of clutch 404 is affixed to shaft 402. In line with shaft 402 is shaft 405, journalled in standard 406 and wall 407. The end of 405 next to 402 carries the driven member of clutch 404. Clutch 404 normally stands engaged, through clutch lever 408, pivoted in standards 409, 410 in the base being drawn closed by spring 411 extending from pedestal 412 on journal standard 406 to lever 408.

Shaft 405 has affixed to its mitre gear 413 which engages mitre gear 414 on shaft 415, journalled in standards 416, 417, 418 in the base. Shafts 405 and 415 rotate in the ratio of one to one, shaft 405 being the driving member. Shaft 415 carries affixed to it cams 419—420. Plunger rods 381, 382 work up and down in lugs 421, 422, 423, and 424, 425, 426 extending from wall 407. Springs 427, 428 maintain the plunger rods and printer bar 380 in the topmost position. Plunger rods 381, 382 carry arms 429, 430. When cams 419, 420 are rotated by crank 403 through shafts 402, 405 and 415, they press on arms 429, 430 and draw down bar 380 and make the printing impression. This occurs at the end of the first half revolution of crank 403. The latter half revolution allows the plunger arms to rise and causes the progress of the ribbon to take place. Thumb plate 386 is then turned, 383 lifted and the ticket removed.

In order to prevent backward rotation, shaft 402 is fitted with a ratchet wheel 431 and pawl 432 and shaft 405 is fitted with ratchet wheel 433 and pawl 434.

In order to prevent crank 403 from rotating more than once at a time, cam 435 is fixed to it, inside of wall 369. In Fig. 18 the cam crank 403 is indicated in dotted lines, and a chain dotted circle indicates its radius of action. The surface of cam 435 retreats to shoulder 436. Magnet 437 has armature lever stop peg 438 and armature lever 439, retracted by spring 440. The stop end, 441 of lever 439 fits under the shoulder 436 and rests on the top of pillar 442, and has shoulder stop 443. In the view of Fig. 14 end 441 is preventing the further rotation of crank 403, having followed the cam surface in under the shoulder in the previous rotation, drawn in by spring 440. Crank 403 cannot be turned backward at any time on account of pawl 432 of ratchet 431. It thus remains locked up until all of the typewheels are set, when magnet 437 is caused to function, drawing stop 441 from under shoulder 436. Catch 444 is mounted on pivot 445 and has arm 446 which is drawn upward by spring 447, limited by stop arm 448 and peg 449. When end 441 of lever 439 approaches wall 373, its stop 443 clears catch 444 which then rises so that 443 cannot return when the magnet 437 is de-energized. Once drawn towards wall 373 end 441 clears shoulder 436 and cannot impede it again until peg 450 on the periphery of cam 435 is caused to strike beam 446 of catch 444, and depress it. This depression forces catch 444 down below stop catch 443 of end 441, and it retracts, drawn by spring 440, as magnet 437 has in the meanwhile been de-energized.

This does not occur until crank 403 is partly rotated, that being made possible by its being unlocked by the withdrawal of end 441. As the cam is rotated end 441 follows it and again is under shoulder 436 at the end of the rotation. This arrangement prevents crank 403 from being rotated prematurely, it being automatically locked after one revolution until time for another printing to take place.

Shaft 402 carries three commutators 451, 452, 453, with brushes for closing contacts, 454, 455, 456, at certain angles on the rotation of crank 403, as later described.

The top cover is in contours, going under type printing bar 380 at 457, over the escapement wheels on shaft 294 at 458 and rising in housings at 459, 460. At 464 the top contains the window 288 for viewing the script wheels.

Fig. 21 is a section of friction drum 461, which enables shaft 248 to drive the gears 289. Fig. 22 is a plan of the spring leaf portion of 462. Drum 461 is affixed to gear 289. Spring disc 462 is affixed to shaft 248 by tongue and groove engagement, the tongues on 462. Spring disc 462 thus rotates with shaft 248 at all times. It has four wings as 463 turned down. The bottoms of the wings rest on gear 289, and the top of the wing disc table on the inside of drum 461. The pressure of the spring wings is sufficient to carry gear 289 along unless it is stopped; when the wings rub over the surface of gear 289, ready to start it again when the obstruction is removed. One motor thus supplies friction drive for the seventeen gears 289.

Figure 24 is a diagram of electrical connections for the printer.

At 139 the printer current is superimposed on the telephone wire 138—140 at the sending end. At the receiving end of the line at 141 the printer current is deposed from the telephone line by apparatus 142 well known in the art.

Telephone line 500 leads to ear phones 501 and earth 502.

Line 503 goes to magnet 334 and from there to contact 376, made by manual operation of starting lever 367. When lever 367 makes contact at 377, the apparatus is cut out, the line being earthed through lead 504 and earth contact 505.

Four units are shown, E, F, G and H, corresponding to units A, B, C and D of the sender. Any number of units may be used, preferably inserted between units F and G. In the drawings unit E is shown as having operated, unit F about to be operated and units G and H awaiting operation.

Arm 506 of bell crank lever 336 carries two contact plates on the under side and a connection to ground. On the upper side of 337, a twin of 336, is a contact plate which makes two contacts. On the underside are contact springs 339, 340 and 341, and on the upper side contact springs 342, 343.

When arm 506 is in the position shown in unit F, circuit E1 exists, made up of line 503, magnet 334E, contact 376, brushes 339—340 through contact block 507 on under side of 506, lead 508L, to magnet 310E, return lead to magnet 353E, lead 509 to contact spring 341, block 508 and lead 510 back to ground 504—505. If the line circuit is not strong enough, relays may be inserted at points 511 or 512 or in lead 503.

When the alternating impulses arrive they do not affect magnets 334E and 353E, but do operate the polarized magnet 310E, pulling armature arm 311 back and forth and permitting 314 and 315 to escape tooth by tooth until the selected position is reached. When the prolonged impulse occurs, on either phase, magnets 353E and 334E are energized and function. Magnet 353E responds first. It completes circuit E2 as follows: Line 503, magnet 334E, contact 376, lead 513, arm 354, contact 357, lead 514, magnet 358E, lead 515, lead 510 and to earth, 504—505. When armature 354 of magnet 353E is locked up by bell crank armature catch 360 of magnet 358E, contact 357 is made and continue closed while circuit E2 exists, energizing magnet 358E, which retains 354 locked up after 353E is de-energized, and until 358E is de-energized.

When armature 354 is locked up, contact block 364 attached to armature 354 but electrically isolated therefrom, breaks contacts 365, 366.

Slightly subsequent to the action of magnet 358E, magnet 334E, energized at the same time, attracts armature 336 which is locked up by catch 344. This causes arm 506 to rise breaking contacts 339, 340, 341, which breaks circuit E1. This leaves arm 311 of magnet 310E in the last position to which it was drawn, and not subject to further change, holding its typewheel ready in the selected printing position.

The circuit of E1 which energized magnet 334E is broken but magnet 334E remains energized through the new parallel circuit through it of E2. The breaking of contact at 364 prevents lead 516 from passing the prolonged impulse of the line current to 334F, which would otherwise take place through contacts 365, 364, 366 and line 517.

Coincidentally with the action of magnet 334E and magnet 353E, local magnet A20 of the sender functions, breaking local circuit Aa1, and de-energizing clutch magnet A9. A10 now breaks the line at contact 124. The apparatus is so adjusted that magnet 353E locks up armature 354; magnet 334E locks up 336, and magnets Aa20 locks up Aa22 in close succession in the order named. These magnets thus have time to function before the line is broken at 124. When the line is thus broken magnet 358E is de-energized. This unlocks 354 and makes contact between 364, 365, 366. Magnet 334E is also de-energized but no function results since 336 is locked up by 344. The contact at 364, 365, 366 is made before the second disc unit of the sender begins sending alternating impulses. When B10 makes contact at 129 and sets up the main line B2 more time is taken than by the descent of 354. Line B2 is made up as follows; lead from sender, line, lead 503, lead 516, contact 342, block 509, contact 343, contact 365, block 364, contact 366 and lead 517. This circuit remains intact during the following operations, except that the line by-passes magnet 334F, through 518.

Circuit F1, through magnet 334F, is similar to circuit E1, and the whole unit functions as did E1, which is shown as having completed its functions, 334E being locked up and block 364 making line 517.

Unit G functions in a similar manner to units E and F. Unit H, however, being the terminal unit functions slightly differently, in its concluding action.

Magnet 334H is energized through lead 521, and locks up armature as before. When block 364 is dropped to contact 365, 366, lead 503H energizes magnet 437. This attracts armature 439, draws stop 441 from under shoulder 436. 441 is then locked up by catch 444.

Printing crank 403 may now be manually rotated. As this occurs, stud 450 of cam 436 contacts with arm 446 of catch 444, and frees 441, permitting it to be drawn back against cam 435, which it follows until shoulder 436 is reached at the end of the revolution.

Meanwhile the commutators on shaft 402 have come into action. Commutator 451 has segment 523, with brushes 454. Shortly after the beginning of the printing rotation of shaft 402, 454 closes local circuit 524 with battery 525 and magnet 373, which, on being thus energized frees lever 367. Spring 368 draws lever 367 which makes contact 377. This cuts out the printing apparatus and closes the line to earth for any uses of the sending apparatus.

The rotation of crank 403 causes the printing to take place on the completion of one-half a revolution. Shortly thereafter commutator segment 526 of commutator 452 strikes brushes 455. This completes a local circuit 527, having battery 528 and leads in parallel to the polarized magnets 310. This is a direct current and draws all the arms back to the left which are on the right and holds all the arms on the left which were on the left. This positions the arms for the initial position on the next functioning of the machine. As the crank 403 continues to advance circuit 527 goes dead, the commutator segment passing the brushes.

Next commutator segment 529 strikes brushes 456 and completes local circuit 530, with battery 531 and magnet 353X. This attracts armature and closes contact at 357X, and completes circuit 532 with battery 533, through contact 357X, magnet 358X and battery 533, and in parallel with the tilting magnets 309, and their circuit breakers. This includes contact 327 between springs 322 and 323 in series with its tilting magnet winding 309. When direct current circuit 532 is closed all the tilting magnets are in parallel and are energized. This causes all arms 311 to be tilted free of the escapement teeth. The escapement shafts are in various angular attitudes. When the escapement wheel teeth are cleared all the shafts begin to rotate. As each draws near to high tooth 326, cam 324 breaks circuit 532 as regards its particular magnet. The arm 311 descends and stops the high tooth 326. When all the cams 324 have broken all the contacts 327, circuit 532 is broken. It remains alive until the last of the contacts 327 is broken. Then it goes dead, catch 360 is released and contact 357X is broken, since magnet 353X was de-energized by the passing of segment 529 as crank 403 completed its rotation.

The clearing crank 345 is now rotated, which unlocks magnets 334E to H and the motor is turned off. When another ticket is to be printed the motor is turned on and switch 367 is turned to make contact 376.

The motor for the escapement shafts is shown at 291 with circuit 534, switch lever 535, switch 536 and power leads 537.

An emergency lever 538 with switch 539 and leads 540 in parallel with brush 456 and circuit 530 is provided for operating the tilting magnets 309 in case of emergency, as when a mistake might be discovered during setting. This would be corrected by breaking line 503—504 by switch 367, and then clearing the tilting magnets by switch 539, and rotating the clearing handle 345.

If it is desired to clear after setting and without printing, the clutch lever 408 may be drawn back and held manually while crank 403 is rotated. This is followed by turning clearing crank 345, when the machine will be in readiness for another setting.

It is to be noted in the diagrams that batteries are provided for each independent circuit. This may be obviated by sources of current in multiple if desired. Grounds are also shown for the sake of clearness, but in operations it is likely that complete metallic circuits would often be employed, all of which is within the scope and spirit of my invention.

The apparatus may be arranged for use with a separate circuit from each sending unit to each typewheel unit, with an added circuit for the final impulse. This may be accomplished with high frequency multiple channel wired wireless methods well known in the art.

Fig. 25 is a diagram of the sending apparatus when each unit has a separate channel. Device 600 superimposes upon telephone line 601 with ground 602 and ear pieces 603, the multiple high frequency channels needed.

Transmitting units J, K, L, and M are provided, although a greater number may be used. To start the apparatus switch 62 is closed. This starts motor 35, fed from power leads 121. Motor 35 drives shaft 7, fitted with spur gears 6 and clutches 8. After motor 35 starts shaft 7 it will rotate idly until magnets as J9, K9, L9 and M9 are caused to function. When they are energized and cause clutches to engage spur gears, discs J1, K1, L1, and M1 cannot start, being held by mechanical stop 64a.

In order to energize the local clutch magnets, circuit 604 is formed. When the ticket inserted in the machine makes contact 113—114 and switch 63 is closed, circuit 604 goes through parallel leads to the clutch magnets, they being in parallel with its battery 605.

In the illustration, Fig. 25, the clutch magnet armatures K10 and M10 are shown closed, being in operation, while J10 and L10 are open, having already functioned.

The closing of armatures 10 creates the line circuits and closes the clutches. The commutator discs will now function when stop 64a is removed.

Owing to the settings of the keys and to the fact that all the discs start simultaneously, some will be stopped before others are stopped. When the prolonged impulses occur, magnets as 20 are caused to be energized, breaking their armature contacts. This de-energizes the clutch magnets and the clutches are disengaged, the discs returning to their initial positions independently of each other.

As in this form of connections the last disc is not the one which can be depended on to send the last prolongation, means is provided to send a prolonged impulse upon the completion by the last disc of its prolonged impulse.

For this purpose magnet 606 is inserted in circuit 604. When all the contacts J123, K128, L131 and M134 are broken, the whole circuit 604 goes dead, and magnet 606 is de-energized.

Magnet 606 has armature 608, on circuit 607 which includes contact 609, battery M610, contact at lever switch 63, and magnet 611. When magnet 606 is energized, armature 608 is attracted and contact 609 cannot be made. But when magnet 606 is de-energized by the braking of the clutch magnet circuits the circuit 607 is set up.

Magnet 611 has armature 612 with ground 613. When 611 is energized it makes contact 614, which sets up the final line circuit 615, battery 616, magnet 617 and line lead 618, to device 600, arising at ground 613 and going to the printer. Contact 614 is locked up as long as magnet 617 remains energized, but when the circuit goes dead from the printer, 614 is not broken because 611 remains energized by circuit 607. It is now deenergized through switch 63 breaking circuit 607, which allows armature 612 to retract and break 614. Switch 63 is so arranged that circuit 604 is closed before 607 is closed, so that armature 608 being attracted, circuit 607 cannot be set up at the outset. Or upon the mechanical restoration of contacts, as J123, through the clearing crank 32, magnet 606 is energized and circuit 607 prevented from being set up.

Thus the de-energization of magnet 606 through the breaking of all the local clutch contacts, sends a final direct current impulse to line which effects the function at the printer which was in the previous arrangement effected by the prolongation of the final disc impulse.

When switch 63 closes circuit 604 and engages all the clutches, and mechanical stops 64 and 64a are removed, the discs begin to send impulses to line. Disc J1 starts circuit J2, by connection with batteries J125, J126 and through brush 48 to lead J and thence to contact 124, magnet Jj20 and to line at device 600.

The alternating impulses pass to line and the prolonged impulse energizes magnet Jj20, which attracts armature Jj22 and breaks contact J123 which de-energizes magnet J9. This causes contact 124 to be broken, and the clutch to be disengaged allowing disc J1 to return to its initial position.

Meanwhile all the other units have been functioning similarly, and when the last is finished, 618 circuit is completed. After the printer breaks circuit 618, switches 62 and 63 are turned off and the magnets and keys are cleared by the clearing cranks, ready for the next functioning.

When the high frequency multi-channel line reaches the printer, the channels are separated and deposited from the telephone line 700 at device 701, by means well known in the art.

Phone line 702 leads to ear phone 703 and ground 704. Four channel leads, equal in number to the channels from the transmitting discs of the sender are provided, leading to magnets 334N, 334P, 334Q and 334R.

Circuit N1 is made up of lead Na, magnet 334N, contact made by switch arm 367X designated 376N, lead 705 to magnet 310N, operating arm 311N to set the escapement wheels, back through lead 706 to spring contact 341N, through arm 506 of bell crank armature 336N to lead 710 and to common ground return lead 707, lead 708 and ground 709. The alternating impulses received on this circuit operate magnet 310N, and when the prolonged impulse comes it actuates magnet 334N, attracting 336N which is locked up by catch 344N. Current through Na, however, is not broken, as spring contact 341N does not separate from plate 508 of arm 506. The rising of arm 506, however, closes contact through spring 342N, block 509 and 343N. Arm 336N being locked up these contacts are held in force after current through Na is broken by the sender.

Contacts 342N, 509 and 343N are in circuit N2, which derives current from the final circuit 618 of the sender. N2 starts at 701, follows lead 711 to 342N. All the units operate similarly and start simultaneously. When all have functioned all the contacts as 342P—343P, 342Q—343Q, and 342R—343R are closed in series to provide a path for current from 618, the final impulse which goes through lead 712 to magnet 437Z and back through lead 713 to common ground 707—708—709.

The functioning of magnet 437Z is similar to the function of magnet 437 previously described and the action of the printing crank and other parts is similar, and they are numbered similarly.

When two tickets are desired to be printed which are for adjoining seats and differ only by the seat numbers, or when tickets for seats in adjoining rows in a block are desired to be printed, I provide means for holding the main portion of the ticket printing wheels set, while only the smaller portion including the numbers is changed. This saves the operators considerable time, as only a few wheels at the ends need to be re-set.

In the diagrams in which these portions are shown Figs. 23, 24, 25, 26, only four units are indicated, the retained set portion consisting of two units and the changeable portion of two units, but any number of units may be included and the division made between them at any desired point.

Figs. 23 and 24 indicate the means used in connection with the single channel line, and Figs. 25, 26 the means used with the multiple channel line.

In Fig. 23 a switch, 143, is inserted in circuit Aa1, in series. When this switch is closed, the circuit functions normally for the whole range of units. When the switch is opened circuit Aa1, is dead. The switch goes over and creates circuit 144. Circuit 144 comprises contact 145 of switch 143, lead to switch 63, switch contact at switch 63, contacts 113—114, battery 122 and leads to circuit Cc1, circuit 144 being in parallel with the leads to contact B19.

After transmitting an entire range of discs and after the printer is set to hold part of them and to re-set some, as 310G and 310H, the sender operator clears his machine with the manual clearing levers and sets keys for discs C1 and D1. The motor has been left running. He closes contact 145 with switch 143 and closes switch 63. Magnet A9 is thus by-passed and does not function, hence no signals can be sent by disc A1. As contact A19 is not closed, depending on A10 functioning, magnet B9 gets no current and disc B1 cannot function. Circuit 144—Cc1 energizes magnet C9. The operator then frees discs C and D of stop 64a. Disc C1 then sends current to line until the prolonged signal energizes magnet Cc20 and breaks the clutch magnet circuit, which in turn sets up the next circuit for disc D1. Any number of units may be by-passed at the outset and any desired number retained for the re-setting of the final typewheels of the printer.

In order to cause the printer to function in a corresponding manner, a by-pass unit is inserted between magnets 334F and 334G, in the line at point 519. This by-pass unit could be inserted elsewhere, as desired, to agree with a different setting of switch 143 of the sender.

The by-pass consists of switch lever 367Z, magnet 373Z, switches and connections. The by-pass unit is switched in after the printer is set for a complete printing, but before the printing crank is turned. The following functions are brought into play to hold the typewheels desired to be held and to permit the clearing of the few to be re-set.

The operator cuts off the left hand units through breaking circuit 527 at switch 540. He also cuts off the left hand part of circuit 532 with switch 541. He also breaks line 519 with switches at three points, 542, 543, 544. The breaking of circuits 527 and 532 prevents any impulses from reaching the left hand units from the printing crank commutators, and so they remain set, without being cleared.

The operator now prints the ticket. In the function the units 310G and 310H clear. Switch starting lever 367 returns to contact 377, magnet 373 being energized by circuit 524. Armature 371 has an extra notch 546. Both notches are escaped by 367 when magnet 373 is energized.

In order to receive new impulses to set only units 310G and 310H, the operator turns the clearing crank 345, then throws lever 367 over to the point where it is caught by the second notch 546 of armature 371. This positions it in a median location, not making either contacts 376 or 377. No current can now pass to magnets 334E or 334F, and at the same time the line is not grounded. The operator then closes switch 545, setting up circuit E1Z, through lead 547 to 503Z and magnet 334G, which then functions in the same manner that magnet 334E functioned before.

When circuit E1Z is broken by the energizing of magnet 334G by the prolonged impulse, circuit E2Z is set up similar to circuit E2, through magnet 334G, lead 513Z to armature 354G, thus supplying the second circuit to keep magnet 334G energized. When contact 357G is broken by the sender, magnet 334G is by-passed by lead 516Z, similar to lead 516, to spring contact 520, and so on to lead 521 to magnet 334H, which then functions as when the whole range is operated. Units 310G and 310H are now set. The second ticket is now set up. If the operator desires no more tickets adjoining he cuts circuit E1Z by turning off switch 545, and remakes contacts at 540, 541, 542, 543 and 544. He then turns the printing crank and the whole range of typewheels is cleared.

Magnet 373Z is in parallel with magnet 373, and when 367Z is freed and breaks contact 376Z, lever 367 is freed of the second notch 546 and 367 is returned to the initial position, while 367Z has cut out the by-pass unit, which can only be cut in again by the manual operation of 367Z.

Switch 548 is arranged to make and break contacts 540, 541, 542, 543 and 544 simultaneously.

In order to effect the same functioning in the high frequency channel wired apparatus, additions are made as indicated in Figs. 25 and 26.

In the sender Fig. 25, switch 621 is separately in series with 619 and 620, they being isolated from each other. As shown closed the switch permits normal operation of the whole range of sending discs. When it is opened it breaks contacts of magnets J9 and K9, which cannot then be energized by circuit 604. Units J1 and K1 are thus left idle and units L1 and M1 are free to function as before.

After setting the first ticket and before setting for the coupon of the second ticket, the clearing cranks 32 and 102 are turned. Keys for discs L1 and M1 are then set and the apparatus started as before.

In Fig. 26 the printer is provided with a supplementary switch arm 367Y, similar to 367X, except that it makes contacts for each of the magnet circuits to be operated thereafter while 367X supplies current for all. The switch arm 367Z will serve the purpose when fitted with extra contacts.

When the entire printer is set for the first ticket the operator does not at once print. He first breaks contact 714, cutting off circuit 527 from the units to the left, and he also cuts off the units to the left from circuit 532 by breaking contact 715. These circuits may be broken by switch 548 when it is not connected with 542, 543, 544.

The printing of the first ticket now takes place. It frees units Q and R but cannot affect units N and P which remain set. In order to re-set 310Q and 310R for the coupon of the second ticket, the clearing crank 345 is rotated; lever arm 367X is closed to the second notch 546 and lever arm 367Y is set to the position shown in Fig. 26. The setting of lever arm 367X to point 546 isolates the circuits of units 334N and 334P from the line but does not ground the line as is the case when it is on contact 377.

The printer operator is now ready for current from the sender, and so notifies the sender operator by telephone.

Circuit Qa from line goes to magnet 334Q, then to contact 376Y at lever arm 367Y, thence through 705Y and 705Q2 to magnet 310Q which sets the typewheel, back through spring contact 341Q, to lead 710 and thence to common return 707. When the prolonged impulse comes magnet 334Q is locked up and the circuit goes dead at the sender so that 310Q is not moved again.

Magnet 334R is operated similarly. When they are both locked up circuit N2Y is set up from lead in N2 at device 701, lead N2, lead N2Y to contact 716, through arm 367Y to N2Y joining 343P, which is isolated. It passes on to 342Q, 342R, 343R, and lead 712 to magnet 437Z and back by lead 713 to common return 707. This releases the printing crank for printing.

Before printing, in case no additional ticket of the same location is wanted, the operator restores contacts 714, 715, and in the case of Fig. 24, contacts 540, 541, 542, 543, 544 and breaks 545.

The printing then takes places and clears the wheels of the whole range. Magnet 373Y is in parallel with magnet 373X, and both levers 367X and 367Y are fully cleared and the line is grounded at 377X. Clearing crank 345 is rotated and the printer is ready for a new functioning.

In the specification and claims hereof the terms "earth" and "ground" used in connection with electrical circuits indicates either a connection to earth or a return by a metallic circuit. In references to electric currents and batteries, it is to be understood that a source of electrical energy is assumed and that it may be either a battery or other convenient source.

It is to be understood throughout the claims that the singular implies the plural and the plural the singular where the context so indicates.

What I claim is:

1. In a printing telegraph system a transmitter adapted to send to line groups of alternating signals, each group derived from one of a plurality of transmitting units, means for driving such units, manual means for permitting the first unit to start and automatic means adapted to transfer each of the next succeeding units to line upon the completion of the signals of the prior unit.

2. In a telegraphic printing system, a transmitter comprising a plurality of commutator discs adapted to be operated in succession, said discs adapted to send current of alternating sign to line upon being rotated; means adapted to be set in advance to stop the rotation of said discs at selected points upon the completion of a selected number of alternations sent to line and to prolong the final impulse, and means automatically operative adapted to be caused to function by said prolonged impulse, whereby said disc is cut out of line and the next succeeding disc cut into line, successively to the final disc.

3. In a transmitting device of the class described having a plurality of transmitting units in the form of discs adapted to send current of opposite sign to line on rotation, in succession, a projecting stud on the periphery of each disc, a series of key stops adapted to be manually operated, one series for each unit, with plungers arranged in the plane of said disc, said key stops adapted upon manual depression to remain depressed and to afford a projection adapted to stop said disc's rotation upon reaching said projection, whereby to send a group of alternating impulses to line of the number determined by the key depressed, and to prolong the final impulse.

4. In a transmitter of the class described having commutator discs, driving means therefor comprising a driving shaft adapted to be rotated, power means adapted to rotate said shaft, a set of clutches, one member slidably mounted on said shaft, the other member affixed to a spur gear rotatably mounted on said shaft, said movable clutch members adapted to be moved longitudinally on said shaft by means of a set of magnets adapted to throw said clutches into engagement with said spur gears upon energization, and adapted to permit said clutches to be withdrawn from engagement upon the de-energization of said magnets; gears frictionally attached to the commutator discs and in engagement with said spur gears and electric means adapted to energize said magnets, whereby to cause said commutator discs to be rotated upon the energization of said magnets.

5. In a transmitter of the class described having a set of commutator discs adapted successively to pass electric current signals of alternating sign to line, each disc adapted to be stopped and thereupon prolong its final signal, a set of contact breaking electro-magnets therefor, each adapted to pass its commutator disc's alternating signals to line without functioning itself, said electromagnets fitted with armatures adapted to be attracted upon the passage to line of the prolonged final signals, one for each electro-magnet and electric contacts in the line operated by the armature and adapted to be broken upon the attraction of the armature, whereby to break said line by the prolonged signal; a catch adapted to retain automatically said contacts in the broken position upon the de-energization of its electro-magnet, and manually operable means for releasing said catches whereby to permit said electric contacts to be re-established.

6. In a transmitter of a printing telegraph system, a set of current contact closers consisting of a sector adapted to be partially rotated about an axis near its point in each direction by the pressing back and forth of a clutch controlling arm set vertically at right angles to the horizontal plane of said sector; said sector fitted with spring means adapted to cause it to return to a median position after the passage in either direction of the clutch controlling arm; a switch adapted to close an electric circuit; a blade adapted to close said switch, positioned above it and adapted to so function upon its descent, said blade pivoted to rotate in the vertical plane, a beak pivoted on the end of said blade positioned over said sector, the point of said beak adapted to be rotated in the vertical plane in a direction towards the axis of said blade, but prevented by a shoulder from rotating in a direction away from said blade axis; said blade adapted to be lifted out of said switch by a finger on a universal bar, said bar adapted to be lifted on manual operation; said beak adapted to rest on the upper surface of said sector when said bar is so lifted; said beak adapted to remain on said sector when the wide part of said sector is rotated towards the axis of said blade; said sector adapted to fall below said face of said sector when said sector is rotated away from said blade axis, whereby to close said switch, adapted thereafter to be broken by the operation of said universal bar.

7. Included in a transmitter of the class described, an organization of electrical circuits, magnets and mechanical instrumentalities as follows, an electrical motor adapted to rotate a clutch carrying shaft, said clutch shaft carrying a set of clutches one side of which comprises a set of spur gears freely rotatable on said shaft, and the other side of which comprises members slidably feathered to said shaft, adapted to be moved by electro magnets; a set of commutator discs comprising commutator discs having gears frictionally attached, said gears in engagement with said spur clutch gears, said discs adapted thereby to be rotated by said spur gears upon the engagement of said slidable clutch member therewith, and to continue to rotate until stopped at selected locations; a set of sources of electrical current of opposite sign, adapted to be transmitted to alternate sections of the disc commutators, from opposite sides, and brushes adapted to transmit from the commutators of said discs alternating impulses to line upon said discs rotating, and to deliver the final impulse prolonged upon the stoppage of said discs, to line, and a line to accept said impulses.

8. Included in a transmitter of the class described a system of electrical circuits, magnets and instrumentalities as follows, a set of commutator discs adapted to deliver alternating impulses to line, a line, said discs adapted to deliver a prolongation of the final impulse on being stopped, a lead circuit to line for each disc, and a set of local circuits in conjunction with the line circuits, comprising local circuits in conjunction with the initial lead to line, a plurality of intermediate local circuits in conjunction with intermediate leads to line circuits and a terminal local circuit in conjunction with the terminal lead to line circuit, said initial local circuit comprising a local source of direct current, a manually operable ticket switch, a manually operable switch, a clutch magnet adapted to close a clutch upon being energized and switch in mechanically the initial commutator disc, and to close an electrical switch and switch in the initial lead to line circuit, and contact switch, normally closed but adapted to be broken by a make and break magnet in the initial lead to line circuit, and an initial lead to line circuit comprising sources of electrical energy of opposite sign, means for transmitting such current to the commutator disc, a commutator disc adapted to receive such current and to transmit it to a lead to line in alternating impulses upon being rotated, and adapted to transmit a prolongation of the final impulse upon being stopped, said disc adapted to be stopped at one of a plurality of selected locations, a contact adapted to be closed by the energization of the clutch magnet on the initial local circuit, and a make and break magnet adapted to make and break a contact, and the line, returning by ground, said magnet so set as to break said initial local circuit upon energization, said magnet adapted to remain neutral upon the passage of the alternating impulses, and to be energized by the final prolonged impulse, whereby to transmit a selected group of alternating impulses to line and to cut from line automatically at the end of such group said initial disc.

9. The matter of claim 8 including contiguous to said initial local and initial line circuits, intermediate local and intermediate line circuits in conjunction therewith as follows: an intermediate local circuit comprising a battery of direct current, a switch adapted to be made by the de-energization of the clutch magnet of the prior circuit, an intermediate clutch magnet adapted to switch in an intermediate disc mechanically and to close a circuit for the lead to line circuit and a contact adapted to be broken by the energization of a magnet in the lead to line circuit, and in conjunction therewith a lead to line circuit arising in grounded batteries of opposite sign adapted to be applied to the commutator disc, an intermediate commutator disc, adapted to receive current from said batteries and to deliver alternating impulses to the lead to line and a prolonged impulse on being stopped, said disc adapted to be stopped by a selected key, one of a plurality of selected keys adapted to stop said disc, a lead, a contact adapted to be made by said clutch magnet upon energization, and a make and break magnet adapted to break said local circuit upon being energized, said magnet not susceptible to said alternating impulses but adapted to function on the prolonged impulse, whereby to transmit, subsequent to prior group, a group of alternating electrical impulses to line and to cut from line automatically at the end of said group, said commutator disc.

10. The matter of claim 8 including one or more intermediate local circuits and one or more intermediate lead to line circuits of the class described in conjunction with a final local circuit and final lead to line circuit, as follows: final local circuit comprising a battery of direct current, a contact adapted to be made by the de-energization of the magnet of the prior local circuit final clutch magnet, and a contact normally closed, adapted to be broken by the energization of the clutch magnet on the final lead to line circuit, said magnet, and final lead to line circuit comprising contacts adapted to be made by the energization of the clutch magnet of the final local circuit, of an alternating character arising as described, and a make and break magnet adapted upon energization to break the final local circuit, said magnet remaining neutral to alternating impulses but functioning on the prolonged impulse, a line to the printer, then by ground back to the grounded batteries of the final disc magnet, whereby to transmit subsequent to prior groups, a final group of electrical alternating impulses to line and to cut from line automatically at the end of said final group said disc and to open said local circuit.

11. Included in a printing telegraphic transmitting device having a plurality of transmitting units, electrical circuits, magnet, switches and mechanical instrumentalities as follows: a plurality of transmitting units, adapted, upon the first being started manually, and upon keys being set, one for each unit of a plurality of possible keys, to transmit groups of alternating impulses, each group terminating in a prolongation of its final impulse, and automatic means adapted to be operated by such prolonged impulses to break the line of the initial unit and transfer to line the next unit, in succession to the final unit, adapted to break the line upon the prolonged impulse functioning.

12. In a telegraph printing mechanism, a transmitter including a manually operable universal bar, magnets adapted to make and break electrical circuit contacts through armature contacts, said armatures provided with said contacts and with catches adapted to be engaged by said universal bar, and other mechanisms adapted to be operated by said universal bar.

13. In a telegraph printing transmitting device of the class described, make and break magnets having catches adapted to hold their armatures in the attracted position after the de-energization of said magnets, and having blade contacts adapted to be made upon the de-energization of clutch magnets, said clutch magnets, and a universal bar, adapted to be lifted by manual operation, said universal bar adapted to release said armature from said catches and to lift said blade contacts out of contact.

14. In a transmitter of the class described a plurality of clutches, said clutches operated by magnets, a set of magnets therefor, said clutches having arms adapted to be moved back and forth by said magnets, a set of sectors, pivoted near their axes, adapted to be partly rotated in either direction by said clutch arms, means in conjunction with said sectors to return them to median position on the passing of said arms in either direction, a blade switch carrying a beak adapted to rest on the wide side of said sector, and adapted to close said switch upon said beak dropping from the sector, adapted to permit such movement only upon its de-clutching function, and means manually operable comprising a universal bar, adapted to lift such blade switch out of contact.

15. In a printing telegraph transmitter comprising a plurality of transmitting units adapted to send groups of alternating signals to line in succession, and adapted to prolong the final impulse of each group, automatic means adapted to cut the current unit out of operation and cut in the succeeding unit upon the occurring of the prolonged impulse of the current unit and through its instrumentality.

16. In a transmitter of the class described a fixed shaft having supports, a commutator disc mounted to rotate freely on said shaft, a spiral spring attached to said disc and to a shaft support, said spiral spring adapted to be wound upon the rotation of said commutator disc, and to return by unwinding, said commutator disc to its initial, angular position upon release of said commutator disc, means adapted to rotate said commutator disc comprising a source of power, a pinion adapted to be driven thereby, a gear engaged and driven by said pinion, said gear adapted to rotate freely on said fixed shaft and a friction clutch connecting said gear and said commutator disc adapted to carry said commutator disc into rotation upon the rotation of said gear and to continue said rotation until said commutator disc is stopped; said gear adapted to continue to rotate after the stopping of said commutator disc; means adapted to permit said commutator disc to begin rotation, means to stop its rotation and retain it in the stopped position and means to release it from said stopped position, whereby said spiral spring may unwind and return said commutator disc to its initial position and means adapted to release said gear and commutator disc from said power source, whereby to enable said gear to return with said friction clutch and commutator disc.

17. In a telegraph printing system of the class described, a transmitter provided with a plurality of commutator transmitting discs, each adapted to send alternating current to line when connected therewith, and to prolong the final impulse on being stopped by a heel of a key plunger; a plurality of rows of keys, one row for each commutator disc, said keys mounted on plungers in the planes of said discs, each key of a row adapted to stop the disc of its row; upon being depressed and retained in the depressed position; by means of its plunger and heel thereof, prior to the starting of the rotation of said disc, and means for holding said key depressed, whereby to limit to a selected number the alternations sent to line by said disc.

18. In a printing telegraph system of the class described a transmitter with a plurality of transmitting units comprising means to transmit signals from some of said units while others are isolated, including a switch adapted to be manually operated, said switch upon being opened adapted to break one or more local circuits including the initial local circuit of said transmitter and connect the local battery of a selected subsequent local circuit with the battery of the initial local circuit, whereby to by-pass a selected number of transmitting units and begin transmission to line with the selected subsequent circuit and its connections.

19. In a transmitter of the class described, a set of magnets adapted to cause clutches in connection therewith to function, said clutches comprising in each case a bell crank lever, with a perpendicular arm adapted to move a slidable clutch member into engagement with a fixed clutch member, upon energization of said clutch magnet, said bell crank lever having a horizontal arm positioned below said perpendicular arm, said horizontal arm carrying an armature for said magnet, and an electric contact adapted to be closed by said horizontal arm upon energization of said magnet; and attraction of said armature, and a spring adapted to disengage said clutch and break said contact on de-energization of said magnet; said magnet adapted to be operated by a local source of direct current, said contact adapted to set up an alternating current circuit to line, whereby to set up said main line upon energization of said magnet and break it upon de-energization thereof.

20. In a transmitter of the class described a plurality of transmitting discs mounted parallel to each other on a common shaft, a stud on each disc so positioned as to encounter and be stopped by a heel of a selected key plunger upon rotation of said disc, and a plurality of key plungers for each disc.

21. The matter of claim 20 comprising in addition a stud mounted on each of said discs, so positioned as to stop the rotation of said disc by contact with a stop upon its reaching its initial position when retracted from said key heel position, and means to so retract said disc.

22. In a transmitter of the class described, a plurality of commutator discs, a plurality of key plungers for each disc, three walls adapted to support the key plungers, comprising a front wall, an intermediate wall parallel thereto and a rear wall of a cylindrical contour adjacent to the peripheries of the commutator discs, said walls provided with apertures for the key plungers.

23. In a transmitter of the class described rows of keys adapted to be depressed manually, and adapted to be retained in the depressed position by latch levers, and universal means adapted to release said keys, comprising a plurality of combs, one for each row of keys, with teeth adapted to cross the paths of the outer ends of said latch levers, said latch levers, and said combs provided with feet adapted to support a universal bar resting on all the feet, said universal bar and means adapted to be manually operated to depress said feet by said bar and thereby free said keys of said latch levers.

24. The universal bar set forth in claim 23 and means adapted to depress it, manually operable, comprising a plurality of arms, pivoted in lugs in the base and resting on said universal bar, a shaft above and parallel to said universal bar, said shaft bearing cams affixed to it and adapted, upon manual rotation of said shaft to depress said arms, whereby said arms depress said universal bar, and a crank attached to said shaft, whereby to manually rotate it, said shaft pivoted in the sides of the frame and in lugs, in the base.

25. In a transmitting machine of the class described having a plurality of commutator discs, with stop studs adapted to stop the retractive motion of said discs, a plurality of latches, pivoted in lugs in the base, and lifted by springs, adapted to engage said disc studs upon the completion of the retractive movement of said discs, and adapted thereupon to hold said discs against forward movement; said latches adapted to act individually in locking said discs, and universal means adapted to release said latches upon manual operation, simultaneously, comprising a shaft across them all and acting as a pivot for them in their lugs, said shaft fitted with a crank for manual operation, and prongs affixed to said shaft at locations in said lugs, adapted to depress said latches upon partial rotation of said shaft.

EDWIN HOPKINS.